US012614117B2

(12) United States Patent
Arcot Desai et al.

(10) Patent No.: US 12,614,117 B2
(45) Date of Patent: *Apr. 28, 2026

(54) SYSTEMS AND METHODS FOR LABELING LARGE DATASETS OF PHYSIOLOGICAL RECORDS BASED ON UNSUPERVISED MACHINE LEARNING

(71) Applicant: NeuroPace, Inc., Mountain View, CA (US)

(72) Inventors: Sharanya Arcot Desai, Sunnyvale, CA (US); Thomas K. Tcheng, Pleasant Hill, CA (US); Benjamin E. Shanahan, San Jose, CA (US)

(73) Assignee: NeuroPace, Inc., Mountain View, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 18/499,909

(22) Filed: Nov. 1, 2023

(65) Prior Publication Data

US 2024/0062118 A1    Feb. 22, 2024

Related U.S. Application Data

(63) Continuation of application No. 17/948,947, filed on Sep. 20, 2022, now Pat. No. 11,842,255, which is a
(Continued)

(51) Int. Cl.
*G06N 20/00* (2019.01)
*G06F 9/30* (2018.01)
(Continued)

(52) U.S. Cl.
CPC ......... *G06N 20/00* (2019.01); *G06F 9/30036* (2013.01); *G06F 18/2155* (2023.01);
(Continued)

(58) Field of Classification Search
CPC .......... G06N 20/00; G06N 3/08; G06N 3/044; G06N 3/045; G06N 7/01; G06F 9/30036;
(Continued)

(56) References Cited

U.S. PATENT DOCUMENTS 6,016,449 A     1/2000   Fischell et al.
6,480,743 B1   11/2002   Kirkpatrick et al.
(Continued)

FOREIGN PATENT DOCUMENTS

WO          2016154298          9/2016

OTHER PUBLICATIONS

Camara et al. "Resting tremor classification and detection in Parkinson's disease patients". Retrieved from Internet: https://www.sciencedirect.com/science/article/pii/S1746809414001414. (2015).
(Continued)

*Primary Examiner* — Jianxun Yang
(74) *Attorney, Agent, or Firm* — LOZA & LOZA, LLP; David S. Sarisky

(57) ABSTRACT

A deep learning model and dimensionality reduction are applied to each of a plurality of records of physiological information to derive a plurality of feature vectors. A similarities algorithm is applied to the plurality of feature vectors to form a plurality of clusters, each including a set of feature vectors. An output comprising information that enables a display of one or more of the plurality of clusters is provided, and a mechanism for selecting at least one feature vector within a selected cluster of the plurality of clusters is enabled. Upon selection of a feature vector, an output comprising information that enables a display of the record of physiological information corresponding to the selected feature vector is provided, and a mechanism for assigning a label to the displayed record is enabled. The assigned label is then automatically assigned to the records
(Continued)

corresponding to the remaining feature vectors in the selected cluster.

20 Claims, 20 Drawing Sheets
(5 of 20 Drawing Sheet(s) Filed in Color)

Related U.S. Application Data continuation of application No. 16/796,692, filed on Feb. 20, 2020, now Pat. No. 11,481,578.

(60) Provisional application No. 62/809,427, filed on Feb. 22, 2019.

(51) Int. Cl.
| | |
|---|---|
| *G06F 18/214* | (2023.01) |
| *G06F 18/22* | (2023.01) |
| *G06F 18/2321* | (2023.01) |
| *G06N 3/08* | (2023.01) |

(52) U.S. Cl.
CPC .......... *G06F 18/22* (2023.01); *G06F 18/2321* (2023.01); *G06N 3/08* (2013.01); *G06V 2201/031* (2022.01)

(58) Field of Classification Search
CPC .. G06F 18/2155; G06F 18/22; G06F 18/2321; G06F 2218/08; G06F 2218/12; G06V 2201/031
See application file for complete search history.

(56) References Cited

U.S. PATENT DOCUMENTS

| | | | |
|---|---|---|---|
| 6,594,524 | B2 | 7/2003 | Esteller et al. |
| 6,810,285 | B2 | 10/2004 | Pless et al. |
| 7,209,787 | B2 | 4/2007 | Dilorenzo |
| 7,231,254 | B2 | 6/2007 | Dilorenzo |
| 7,242,984 | B2 | 7/2007 | Dilorenzo |
| 7,277,758 | B2 | 10/2007 | Dilorenzo |
| 7,280,867 | B2 | 10/2007 | Frei et al. |
| 7,324,851 | B1 | 1/2008 | Dilorenzo |
| 7,403,820 | B2 | 7/2008 | Dilorenzo |
| 7,529,582 | B1 | 5/2009 | Dilorenzo |
| 7,542,803 | B2 | 6/2009 | Heruth et al. |
| 7,599,736 | B2 | 10/2009 | Dilorenzo |
| 7,623,928 | B2 | 11/2009 | Dilorenzo |
| 7,676,273 | B2 | 3/2010 | Goetz et al. |
| 7,747,325 | B2 | 6/2010 | Dilorenzo |
| 7,822,481 | B2 | 10/2010 | Gerber et al. |
| 7,853,322 | B2 | 12/2010 | Bourget et al. |
| 7,853,329 | B2 | 12/2010 | Dilorenzo |
| 7,894,903 | B2 | 2/2011 | John |
| 7,899,545 | B2 | 3/2011 | John |
| 7,930,035 | B2 | 4/2011 | Dilorenzo |
| 7,957,797 | B2 | 6/2011 | Bourget et al. |
| 7,957,809 | B2 | 6/2011 | Bourget et al. |
| 7,966,073 | B2 | 6/2011 | Pless et al. |
| 7,974,696 | B1 | 7/2011 | Dilorenzo |
| 7,976,465 | B2 | 7/2011 | Frei et al. |
| 8,027,730 | B2 | 9/2011 | John |
| 8,126,567 | B2 | 2/2012 | Gerber et al. |
| 8,376,943 | B2 | 2/2013 | Kovach et al. |
| 8,478,417 | B2 | 7/2013 | Drew et al. |
| 8,543,214 | B2 | 9/2013 | Osorio et al. |
| 8,543,217 | B2 | 9/2013 | Stone et al. |
| 8,694,115 | B2 | 4/2014 | Goetz et al. |
| 8,706,237 | B2 | 4/2014 | Giftakis et al. |
| 8,731,656 | B2 | 5/2014 | Bourget et al. |
| 8,903,486 | B2 | 12/2014 | Bourget et al. |
| 9,931,508 | B2 | 4/2018 | Burdick et al. |
| 9,955,921 | B2 | 5/2018 | Esteller et al. |
| 10,123,717 | B2 | 11/2018 | Tcheng |
| 10,124,173 | B2 | 11/2018 | Bonnet et al. |
| 10,252,056 | B2 | 4/2019 | Mogul |
| 10,824,942 | B1 | 11/2020 | Bhotika et al. |
| 2002/0103512 | A1 | 8/2002 | Echauz et al. |
| 2003/0018367 | A1 | 1/2003 | Dilorenzo |
| 2003/0171789 | A1 | 9/2003 | Malek et al. |
| 2004/0199217 | A1 | 10/2004 | Lee et al. |
| 2004/0199218 | A1 | 10/2004 | Lee et al. |
| 2004/0215286 | A1 | 10/2004 | Stypulkowski |
| 2004/0267330 | A1 | 12/2004 | Lee et al. |
| 2005/0021103 | A1 | 1/2005 | Dilorenzo |
| 2005/0021104 | A1 | 1/2005 | Dilorenzo |
| 2005/0060007 | A1 | 3/2005 | Goetz |
| 2005/0060008 | A1 | 3/2005 | Goetz |
| 2005/0197590 | A1 | 9/2005 | Osorio et al. |
| 2006/0089924 | A1 | 4/2006 | Raskutti et al. |
| 2006/0111644 | A1 | 5/2006 | Guttag et al. |
| 2006/0251303 | A1* | 11/2006 | He .......................... A61B 5/369 |
| | | | 382/128 |
| 2006/0265022 | A1 | 11/2006 | John et al. |
| 2007/0073355 | A1 | 3/2007 | Dilorenzo |
| 2007/0142862 | A1 | 6/2007 | Dilorenzo |
| 2007/0142874 | A1 | 6/2007 | John |
| 2007/0162086 | A1 | 7/2007 | Dilorenzo |
| 2007/0167991 | A1 | 7/2007 | Dilorenzo |
| 2007/0208212 | A1 | 9/2007 | Dilorenzo |
| 2007/0213786 | A1* | 9/2007 | Sackellares ............ A61B 5/369 |
| | | | 607/45 |
| 2007/0287931 | A1 | 12/2007 | Dilorenzo |
| 2008/0058773 | A1 | 3/2008 | John |
| 2008/0061961 | A1 | 3/2008 | John |
| 2008/0071314 | A1 | 3/2008 | John |
| 2008/0109005 | A1 | 5/2008 | Trudeau et al. |
| 2008/0119900 | A1 | 5/2008 | Dilorenzo |
| 2008/0269631 | A1 | 10/2008 | Denison et al. |
| 2009/0018609 | A1 | 1/2009 | Dilorenzo |
| 2010/0023089 | A1 | 1/2010 | Dilorenzo |
| 2010/0210964 | A1 | 8/2010 | Greene |
| 2010/0217348 | A1 | 8/2010 | Dilorenzo |
| 2010/0241183 | A1 | 9/2010 | Dilorenzo |
| 2010/0249859 | A1 | 9/2010 | Dilorenzo |
| 2010/0292602 | A1 | 11/2010 | Worrell et al. |
| 2011/0040353 | A1 | 2/2011 | Gerber et al. |
| 2011/0307030 | A1 | 12/2011 | John |
| 2012/0245481 | A1 | 9/2012 | Blanco et al. |
| 2012/0265262 | A1 | 10/2012 | Osorio |
| 2012/0289869 | A1 | 11/2012 | Tyler |
| 2013/0053722 | A1 | 2/2013 | Carlson et al. |
| 2013/0096840 | A1 | 4/2013 | Osorio et al. |
| 2013/0345526 | A1 | 12/2013 | Osorio |
| 2014/0148723 | A1 | 5/2014 | Nierenberg et al. |
| 2014/0257128 | A1 | 9/2014 | Moxon et al. |
| 2015/0005592 | A1 | 1/2015 | Osorio |
| 2015/0080670 | A1 | 3/2015 | Osorio |
| 2015/0272496 | A1 | 10/2015 | Klappert et al. |
| 2016/0228705 | A1 | 8/2016 | Crowder et al. |
| 2016/0310070 | A1 | 10/2016 | Sabesan |
| 2016/0375249 | A1 | 12/2016 | Bonnet |
| 2016/0375251 | A1 | 12/2016 | Bonnet |
| 2016/0375252 | A1 | 12/2016 | Bonnet |
| 2017/0095194 | A1 | 4/2017 | Krauss et al. |
| 2017/0136240 | A1 | 5/2017 | Mogul |
| 2017/0196497 | A1 | 7/2017 | Ray et al. |
| 2017/0265764 | A1 | 9/2017 | Osorio et al. |
| 2018/0300576 | A1 | 10/2018 | Dalyac et al. |
| 2019/0065996 | A1* | 2/2019 | Matsuki .................. G06F 16/35 |

OTHER PUBLICATIONS

Dumpelmann. "Early seizure detection for closed loop direct neurostimulation devices in epilepsy". Retrieved from Internet: https://iopscience.iop.org/article/10.1088/1741-2552/ab094a/meta. (2019).

Bateman et al. "Serotonin reuptake inhibitors are associated with reduced severity of ictal hypoxemia in medically refractory partial epilepsy," EPILEPSIA: 51:2211-2214 (2010).

Baud et al., "Multi-day rhythms modulate seizure risk in epilepsy." Nat Commun 9, 88, (2018).

(56) References Cited

OTHER PUBLICATIONS

Brinkmann et al. "Forecasting Seizures Using Intracranial EEG Measures and SVM in Naturally Occurring Canine Epilepsy," G. A. PLoS.One.,10:e0133900 (2015).

Cantero et al. "Sleep-dependent theta oscillations in the human hippocampus and neocortex,", J Neurosci,23:10897-10903 (2003).

Carrington et al. "Effect of focal low-frequency stimulation on amygdala-kindled afterdischarge thresholds and seizure profiles in fast- and slow-kindling rat strains," Epilepsia,48:1604-1613 (2007).

Chan et al.: "Automated seizure onset detection for accurate onset time determination in intracranial EEG," Clin. Neurophysiol.,119:2687-2696 (2008).

Colom. "Septal networks: relevance to theta rhythm, epilepsy and Alzheimer's disease," J Neurochem., 96:609-623 (2006).

Conradsen et al., "Automated algorithm for generalised tonic-clonic epileptic seizure onset detection based on sEMG zero-crossing rate", IEEE Transactions on Biomedical Engineering, Copyright IEEE 2011, pubs-permissions@ieee.org.

Crespel et al. "Sleep influence on seizures and epilepsy effects on sleep in partial frontal and temporal lobe epilepsies," M. Clin. Neurophysiol., 111 Suppl 2:S54-S59 (2000).

D'Alessandro et al."A multi-feature and multi-channel univariate selection process for seizure prediction", Clinical Neurophysiology 116 (2005) 506-516.

Desai et al. "Evaluation of potential epilepsy biomarkers in long-term electrocorticographic activity", Abstracts, Nov. 21, 2016, www.aesnet.org, 3 pages.

Desai et al."Deep Learning for seizure classification and potential seizure biomarker discovery", Abstract, published online at www.aesnet.org on Nov. 20, 2017; 2 pages.

Desai. "Insights from mining large-scale human EcoG data", ICTAL2017, The Penumbra Conference, presented Aug. 21, 2017; 9 pages.

Desai et al. "Recurrent Neural Networks for Forecasting Epileptiform Electrographic Activity 24 Hours in Advance", Abstracts, Nov. 6, 2018, www.aesnet.org, 3 pages.

Desai et al."Transfer-learning for differentiating epileptic patients who respond to treatment based on chronic ambulatory ECoG data," in 2019 9th International IEEE/EMBS Conference on Neural Engineering (NER), IEEE, pp. 1-4, (2019).

Desai et al. "Quantitative electrocorticographic biomarkers of clinical outcomes in mesial temporal lobe epileptic patients treated with the RNS system", Clinical Neurophysiology 130, 1364-1374, (2019).

Esteva et al. "Dermatologist level classification of skin cancer with deep neural networks", Nature, vol. 542, published Feb. 2, 2017, pp. 115-118.

Gabor. "Automated Seizure Detection Using a Self-Organizing Neural Network", Validation and Comparison with Other Detection Strategies, Dept. of Neurology, University of CA, Davis Medical Center, Accepted for Publication Feb. 28, 1998.

Gabor et al. "Automated Seizure Detection Using a Self-Organizing Neural Network", Dept. of Neurology, University of CA, Davis Medical Center, Jan. 5, 1996; Published Apr. 15, 1996, Electroencephalography and Clinical Neurophysiology 99 (1996) 257-266.

GarcíA-Hernández et al."Septo-hippocampal networks in chronic epilepsy", EAT Neurol. Mar. 2010; 222(1): 86-92.

Goodman et al. "Preemptive low-frequency stimulation decreases the incidence of amygdala-kindled seizures," Epilepsia,46:1-7 (2005).

Herman et al. "Distribution of partial seizures during the sleep—wake cycle: differences by seizure onset site," Neurology,56:1453-1459 (2001).

Hussein et al.. "Epileptic Seizure Detection: a Deep Learning Approach", ArXiv:1803.09848v1, Mar. 27, 2018, pp. 1-12; 2018.

Karoly et al. "The circadian profile of epilepsy improves seizure forecasting." Brain 140, 2169-2182, (2017).

Kharbouch et al."An algorithm for seizure onset detection using intracranial EEG," Epilepsy Balmy. Dec. 2011; 22(01): S29-S35.

Khan et al. "Automatic Detection of Seizure Onset in Pediatric EEG", International Journal of Embedded Systems and Applications (IJESA) vol. 2, No. 3, Sep. 2012.

Kisilev et al., "Medical Image Description Using Multi-task-loss CNN." Deep Learning and Data Labeling for Medical Applications. DLMIA Labels 2016 2016. Lecture Notes in Computer Science( ), vol. 10008. Springer, Cham. https://doi.org/10.1007/978-3-319-46976-8_13.

Krizhevsky et al. "ImageNet Classification with Deep Convolutional Neural Networks", NIPS'12 Proceedings of the 25th International Conference on Neural Information Processing Systems—vol. 1, pp. 1097-1105, Dec. 3, 2012.

Langan et al. "Case-control study of SUDEP," Neurology,64:1131-1133 (2005).

Lecun et al. "Deep Learning", Nature, May 27, 2015, vol. 521; DOI:10.1038/nature14539; pp. 436-444.

Lee et al. "Intracranial EEG seizure-onset patterns in neocortical epilepsy," EPILEPSIA: 41:297-307 (2000).

Ling et al. "Waveform Modeling and Generation Using Hierarchical Recurrent Neural Networks for Speech Bandwidth Extension", IEEE/ACM Transactions on Audio, Speech, and Language Processing, vol. 26, No. 5, pp. 883-894, May 2018.

Litt et al. "Epileptic Seizures May Begin Hours in Advance of Clinical Onset: a Report of Five Patients", Neuron, vol. 30, 51-64, Apr. 2001.

Logesparan et al. "Optimal features for online seizure detection", Medical & Biological Engineering & Computing, 50.7 (2012): 659-669, and Supplementary Material relating to article.

Lysyansky et al. "Optimal number of stimulation contacts for coordinated reset neuromodulation," Front Neuroeng.,6:5 (2013).

Malow. "The interaction between sleep and epilepsy," Epilepsia,48 Suppl 9:36-38 (2007).

Meisel et al. "Intrinsic excitability measures track antiepileptic drug action and uncover increasing/ decreasing excitability over the wake/sleep cycle". Proc Natl Acad Sci U S A 112, 14694-14699, (Nov. 6, 2015).

Miller et al. "Anticonvulsant effects of the experimental induction of hippocampal theta activity," Epilepsy Res., 18:195-204 (1994).

Minecan et al. "Relationship of epileptic seizures to sleep stage and sleep depth," Sleep,25:899-904 (2002).

Ng et al. "Why are seizures rare in rapid eye movement sleep? Review of the frequency of seizures in different sleep stages," M. Epilepsy Res. Treat.,2013:932790 (2013).

Ogren et al. "Three-dimensional hippocampal atrophy maps distinguish two common temporal lobe seizure-onset patterns," Epilepsia, 50(6):1361-1370 (2009).

Osorio et al. "Real-Time Automated Detection and Quantitative Analysis of Seizures and Short-Term Prediction of Clinical Onset", Epilepsia, 39(6):615-627 (1998).

Pailla et al. "Autoencoders for learning template spectrograms in electrocorticographic signals", Journal of Neural Engineering, vol. 16, No. 1, Jan. 14, 2019.

Perucca et al. "Intracranial electroencephalographic seizure-onset patterns: effect of underlying pathology," J. Brain: 137:183-196 (2014).

Popovych et al. "Desynchronizing electrical and sensory coordinated reset neuromodulation", Frontiers in Human Neuroscience, Mar. 20, 2012, vol. 6, Article 58.

Russakovsky et al. "ImageNet Large Scale Visual Recognition Challenge", International Journal of Computer Vision, available online Apr. 11, 2015, published Dec. 2015; vol. 115, Issue 3, DOI 10.1007/s11263-015-0816-; pp. 211-252.

Schiller et al. "Characterization and comparison of local onset and remote propagated electrographic seizures recorded with intracranial electrodes," Epilepsia, 39:380-388 (1998).

Shoeb. "Application of Machine Learning to Epileptic Seizure Onset Detection and Treatment", Thesis Submitted to Harvard-MIT Div. of Health Sciences re Dr. of Philosophy in EE and Med Engineering at MIT, Sep. 2009.

Shoeb et al. "Application of Machine Learning to Epileptic Seizure Detection", Appearing in the Proceedings of the 27th International Conference on Machine Learning, Haifa, Israel 2010, Copyright 2010.

Skarpaas et al., Clinical and electrocorticographic response to antiepileptic drugs in patients treated with responsive stimulation, Epilepsy & Behavior 83, 192-200, (2018).

(56)          References Cited

OTHER PUBLICATIONS

Spencer et al. "Morphological patterns of seizures recorded intracranially," 33:537-545 (1992).

Tass et al. "Long-lasting desynchronization in rat hippocampal slice induced by coordinated reset stimulation", Physical Review F 80, 011902 (2009).

Tass et al. "Coordinated reset has sustained aftereffects in Parkinsonian monkeys," Ann.Neurol,72:816-820 (2012).

Thodorof et al."Learning Robust Features using Deep Learning for Automatic Seizure Detection", ArXiv:1608.00220, Jul. 31, 2016, pp. 1-12.

Tsiouris et al. "A Long Short-Term Memory deep learning network for the prediction of epileptic seizures using EEG signals", Computers in Biology and Medicine, vol. 99, Aug. 1, 2018, pp. 24-37.

Uriguen et al. "Comparison of background EEG activity of different groups of patients with idiopathic epilepsy using Shannon spectral entropy and cluster-based permutation statistical testing". PLoS One 12, (Sep. 18, 2017).

Van Putten et al. "Detecting temporal lobe seizures from scalp EEG recordings: a comparison of various features," Clin. Neurophysiol.,116:2480-2489 (2005).

Vaswani et al. "Attention is all you need". Advances in Neural Information Processing Systems 30 (2017).

Wackermann. "Beyond mapping: estimating complexity of multichannel EEG recordings," Acta Neurobiol.Exp. (Wars.),56:197-208 (1996).

Welsh et al. "A circadian rhythm of hippocampal theta activity in the mouse," Physiol. Behav,35:533-538 (1985).

Xu et al., "Survey of Clustering Algorithms", IEEE Transactions on Neural Networks, vol. 16, No. 3, May 1, 2005; 35 pages.

Zeiler et al. "Visualizing and Understanding Convolutional Networks", ArXiv:1311.2901v3, Nov. 28, 2013, pp. 1-11.

Zhang et al. "An automatic patient-specific seizure onset detection method in intracranial EEG based on incremental nonlinear dimensionality reduction", Computers in Biology and Medicine 40 (2010) 889-899. Automated Detection and Quantitative Analysis of Seizures and Short-Term Prediction of Clinical Onset, Epilepsia, 39(6):615-627 (1998).

* cited by examiner

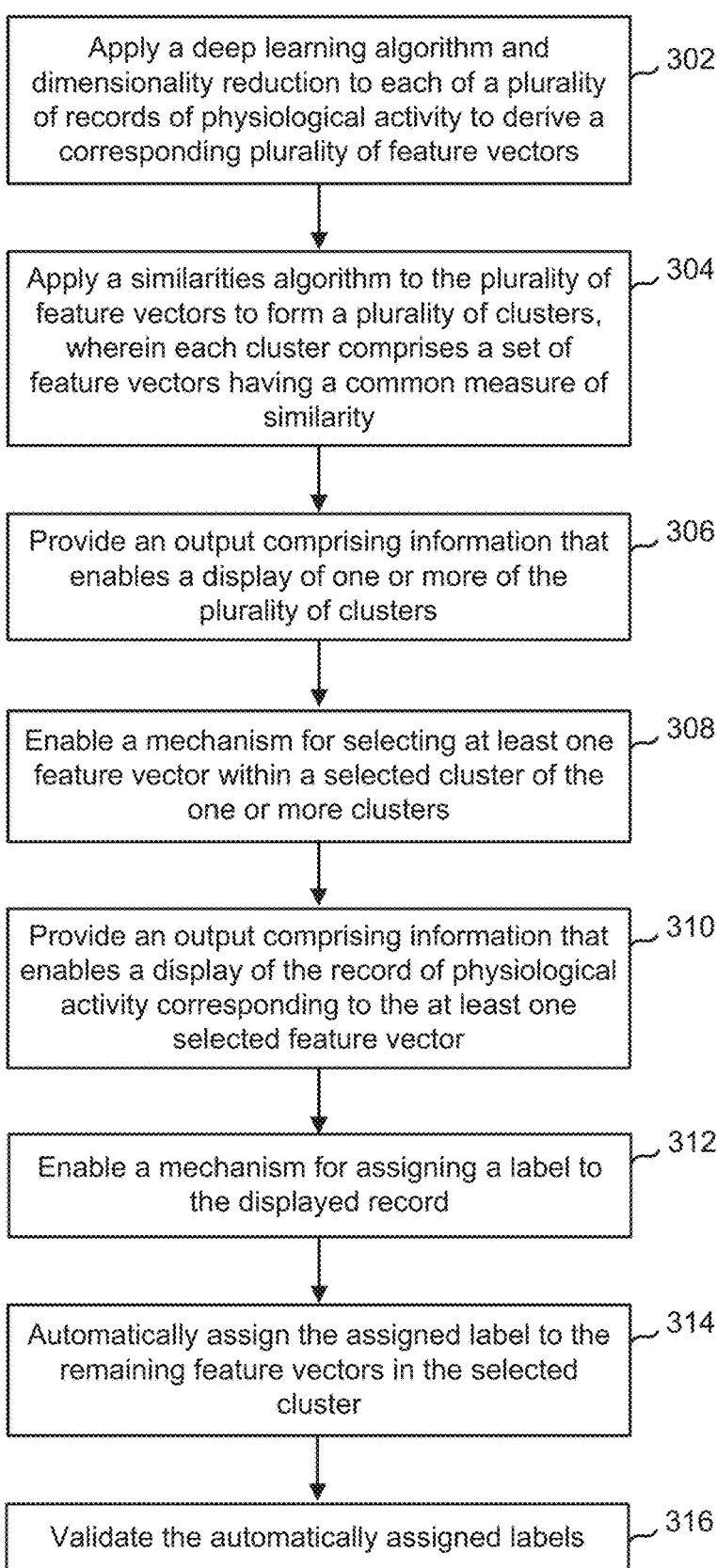

Apply a deep learning algorithm and dimensionality reduction to each of a plurality of records of physiological activity to derive a corresponding plurality of feature vectors — 302

Apply a similarities algorithm to the plurality of feature vectors to form a plurality of clusters, wherein each cluster comprises a set of feature vectors having a common measure of similarity — 304

Provide an output comprising information that enables a display of one or more of the plurality of clusters — 306

Enable a mechanism for selecting at least one feature vector within a selected cluster of the one or more clusters — 308

Provide an output comprising information that enables a display of the record of physiological activity corresponding to the at least one selected feature vector — 310

Enable a mechanism for assigning a label to the displayed record — 312

Automatically assign the assigned label to the remaining feature vectors in the selected cluster — 314

Validate the automatically assigned labels — 316

*FIG. 3*

SYSTEMS AND METHODS FOR LABELING LARGE DATASETS OF PHYSIOLOGICAL RECORDS BASED ON UNSUPERVISED MACHINE LEARNING

CROSS-REFERENCE TO RELATED APPLICATION

This application is a continuation of U.S. application Ser. No. 17/948,947, filed Sep. 20, 2022, now U.S. Pat. No. 11,842,255, entitled "Systems and Methods For Labeling Large Datasets Of Physiological Records Based On Unsupervised Machine Learning," which is a continuation of U.S. application Ser. No. 16/796,692, filed Feb. 20, 2020, now U.S. Pat. No. 11,481,578, entitled "Systems and Methods For Labeling Large Datasets Of Physiological Records Based On Unsupervised Machine Learning," which claims the benefit of and priority to U.S. Provisional Patent Application Ser. No. 62/809,427, filed Feb. 22, 2019, for "Systems and Methods For Labeling Large Datasets Of Physiological Records Based On Unsupervised Machine Learning," the entire disclosures of which are incorporated herein by reference.

TECHNICAL FIELD

The present disclosure relates generally to systems and methods for labeling physiological records or samples, and more particularly, to systems and methods that enable the labeling of large datasets of physiological records based on unsupervised machine learning.

BACKGROUND

A labeled dataset is comprised of a group of records or samples that have been tagged with one or more labels. The process of labeling records in a dataset involves taking a dataset of unlabeled records and augmenting each record with one or more meaningful tags that are informative. For example, labels might indicate whether a photo contains a horse or a cow, which words were uttered in an audio recording, what type of action is being performed in a video, what the topic of a news article is, what the overall sentiment of a tweet is, whether the dot in an x-ray is a tumor, etc. Labels can be obtained by asking humans to make judgments about a given unlabeled record (e.g., "Does this photo contain a horse or a cow?"). After obtaining a labeled dataset, machine learning models and deep learning models can be applied to the records in the dataset so that new unlabeled records can be presented to the model and a likely label can be predicted for that unlabeled record without requiring human input.

Deep learning and machine learning are powerful techniques for analyzing large datasets. However, many deep learning and machine learning algorithms require large labeled datasets. For example, in the more recent years, with the advent of advanced data storage devices and technologies, collection of large medical datasets has become increasingly common and drawing insights from large datasets have proven beneficial in several fields including the medical field. Many of these large medical datasets have tens of thousands of records. For example, thousands of physiological records corresponding to electrical activity of the brain may be collected overtime from patients having an implanted medical device, such as a responsive neurostimulation system.

To this end, an implanted neurostimulation system may be configured to detect neurological events, such as seizures or seizure onsets, through the analysis of electrical activity of the brain sensed through electrodes implanted in or on the brain, and to generate and deliver a form of electrical neurostimulation to the brain in response to such detections. An example of a responsive neurostimulation system is described in U.S. Pat. No. 6,480,743, entitled "System and Method for Adaptive Brain Stimulation," the disclosure of which is herein incorporated by reference. A responsive neurostimulation system, such as described in U.S. Pat. No. 6,480,743, is also configured to store records of electrical activity of the brain ("EEG records"), and to periodically upload these EEG records to external databases. Overtime, these databases may accumulate large datasets of tens of thousands of EEG records from which beneficial insights may be drawn.

In order to draw such beneficial insights, manual expert labeling of datasets of EEG records is initially required for reliably training machine learning models and deep learning models. Human performance on labeling and classification tasks is still considered the gold standard for assessing the performance of machine learning trained models. Preparing large labeled datasets is a challenge in any domain, but especially so in the healthcare domain because the experts/labelers are typically physicians with limited time resources. For example, deep learning and machine learning analyses, prediction, and classification of EEG records requires reliable labelling of the EEG records for training and validation. However, the persons who are most qualified for labeling such EEG records are highly trained neurologists who are typically not able to devote a lot of time for such activities. Additionally, the process of requiring a human to focus on labeling each and every EEG records can be exhausting and such a process is also prone to manual errors due to exhaustion.

It is therefore desirable to provide a more manageable, less time consuming process for human expert labeling of large datasets of physiological records.

SUMMARY

The present disclosure relates to a method of labeling a plurality of records of physiological information included in a dataset of physiological records. The method includes applying a deep learning model and dimensionality reduction to each of the plurality of records to derive a plurality of feature vectors; and applying a similarities algorithm to the plurality of feature vectors to form a plurality of clusters, wherein each cluster includes a set of feature vectors. The method also includes providing an output comprising information, e.g., graphical display and image data, that enables a display of one or more of the plurality of clusters; enabling a mechanism, such a graphical user interface, for selecting at least one feature vector within a selected cluster of the one or more of the plurality of clusters; and providing an output comprising information e.g., graphical display and image data, that enables a display of the record of physiological information corresponding to the at least one selected feature vector. The display of the record of physiological information may be, for example, a time series waveform of electrical activity of the brain. The method further includes enabling a mechanism, such as a graphical user interface, for assigning a label to the displayed record; and then automatically assigning the assigned label to the records corresponding to the remaining feature vectors in the selected cluster.

The automated clustering, outputting, and labeling mechanisms associated with the disclosed method of labeling physiological records provide a technical advantage over prior techniques that simply present physiological records and accept manual labeling of such records on a record-by-record basis. The disclosed method applies deep learning models and dimensionality reduction processes to records to thereby group together records that are likely to be similarly labeled, and then provides display and labeling mechanisms that enable labeling of the entire records in a way that reduces the time involvement of human experts.

The present disclosure also relates to an apparatus for labeling a plurality of records of physiological information includes an interface, a memory, and a processor. The interface is configured to be coupled to a database to receive the plurality of records. The interface is also configured to be coupled to a user interface to receive user inputs, and to be coupled to a display to output display information. The processor is coupled to the memory and interface and is configured to apply a deep learning model and dimensionality reduction to each of the plurality of records to derive a plurality of feature vectors; and to apply a similarities algorithm to the plurality of feature vectors to form a plurality of clusters, wherein each cluster comprises a set of feature vectors. The processor is also configured to provide an output to the interface comprising information that enables a display of one or more of the plurality of clusters on the display; to enable a mechanism, such as a graphical user interface, through the display and user interface for selecting at least one feature vector within a selected cluster of the one or more of the plurality of clusters, and to provide an output to the interface comprising information that enables a display of the record of physiological information corresponding to the at least one selected feature vector on the display. The processor is further configured to enable a mechanism, such as a graphical user interface, through the display and user interface for assigning a label to the displayed record; and to automatically assign the assigned label to the records corresponding to the remaining feature vectors in the selected cluster.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

Various aspects of apparatuses and methods will now be presented in the detailed description by way of example, and not by way of limitation, with reference to the accompanying drawings, wherein:

FIG. 3 is a flowchart of a method of assigning labels to physiological records.

DETAILED DESCRIPTION

Disclosed herein are methods and systems that provide for a more manageable, less time consuming process for human expert labeling of large datasets. As used herein, a "dataset" refers to a collection of information. A dataset may be comprised of one or more records or files of information of a patient or of a patient population. This information may include physiological information of the patient or patients and non-physiological information related to patient demographics, conditions and therapies.

With respect to physiological information, a dataset may include records or files of physiological information corresponding to electrical activity of the brain. Hereinafter, electrical activity of the brain is referred to as an "EEG", the digital representation, i.e., stored data bits, of electrical activity of the brain is referred to as "EEG data", and a physiological record corresponding to electrical activity of a patient's brain is referred to as an "EEG record." It will be understood that EEG includes electrical activity sensed directly from the neural tissue, which sometimes is referred to as electrocorticographic activity, an electrocorticogram, or "ECoG".

Figure 1A:
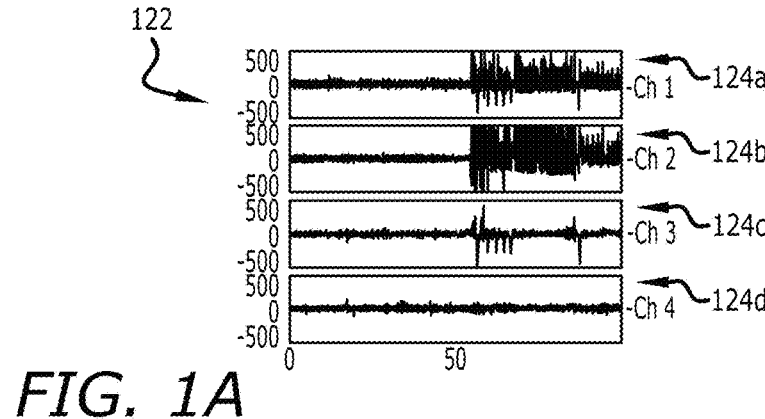
FIG. 1A is an example visual representation of a physiological record in the form of an EEG record corresponding to electrical activity of the brain as recorded by an implanted neurostimulation system.

An EEG record corresponding to electrical activity of a patient's brain may be visualized in the form of a time series waveform image. For example, with reference to FIG. 1A, an EEG record 122 may consist of four channels of EEG data, each visualized as a separate time series waveform 124a, 124b, 124c, 124d. These four separate time series waveforms 124a, 124b, 124c, 124d (and their corresponding EEG data) collectively represent the EEG record 122 and may be individually referred to as sub-records of the EEG record. Depending on the granularity of expert labeling desired, the systems and methods disclosed herein may process the EEG record 122 as a whole (if the aim is to assign a label to the whole EEG record) or may process at the individual sub-record level (if the aim is to assign a label to each sub-record). In the latter case, each of the sub-records may be considered an individual EEG record.

While the methods and systems disclosed herein are primarily described with reference to EEG records in the form of time series waveform images, other forms of EEG records may be used. For example, EEG records in the form of spectrograms may be processed by the methods and systems. Furthermore, while the methods and systems disclosed herein are primarily described with reference to records comprising electrical activity of the brain, it will be appreciated that other physiological information and non-physiological information may be processed.

To this end, other types or modalities of physiological information included in a dataset besides electrical activity of the brain may be included in a dataset. For example, records or files of other modalities of physiological information in a dataset may include measurements of pH levels in neural tissue, blood oxygen levels in neural tissue, neurotransmitters concentrations in neural tissue, heart rate, blood pressure, blood glucose levels, hormones sensed in sweat, accelerometer recordings, and sleep patterns.

With respect to non-physiological information, a dataset may include records or files of patient demographics (e.g., age, gender), patient drug regimen (e.g., type of drug, dose, and time of day of dose), and patient clinical outcomes, such as the rate of electrographic seizure detection and electrographic seizure onset (e.g., as detected and recorded by the implanted neurostimulation system), the rate of clinical seizures (e.g., as reported in a seizure diary or detected based on accelerometer recordings).

Regardless of the type or modality of physiological records used by the method and system, a deep learning model is applied to each physiological record to extract features from that record and provide a multi-dimensional feature vector. While the exact nature or characteristics of the features extracted from the physiological records by the deep learning model are not entirely understood, the features are believed to include hierarchically filtered versions of the data forming the record. The deep learning model may be, for example, a pretrained convolution neural network (CNN), autoencoders, recurrent neural network (RNN), or a deep neural network configured to derive features from the physiological records. These deep learning models are described in Deep Learning, by Yann LeCun, Yoshua Bengio and Geoffrey Hinton. Nature, published May 27, 2015, Volume 521, pp 436-444, which is herein incorporated by reference.

Feature extraction may also be done through pretrained deep learning models, such as AlexNet or Inception-v3; or by training the deep learning models from scratch. AlexNet is described in ImageNet Classification with Deep Convolutional Neural Networks, by A. Krizhevsky, I. Sutskever, and G. Hinton, included in Advances in Neural Information Processing Systems 25 (NIPS 2012), available at http://papers.nips.cc/paper/4824-imagenet-classification-with-deep-convolutional-neural-networks, which is herein incorporated by reference. Other types of feature extraction techniques may be used to extract features. For example, handcrafted algorithms, such as spectral power algorithms, Fast Fourier Transform algorithms or wavelet features algorithms, may be used to extract features.

The pretrained deep learning model may be trained on a type of data that is different from the physiological records to which the model is being applied. This different type of data may be image data that is not physiological in nature. For example, the pretrained deep learning model may be a GoogLeNet Inception v3 CNN pretrained on the ImageNet dataset (image-net.org), which consists of 1.2 million everyday images in 1000 categories. See S. A. Desai, T. Tcheng, and M. Morrell, "Transfer-learning for differentiating epileptic patients who respond to treatment based on chronic ambulatory ECoG data," in 2019 9th International IEEE/EMBS Conference on Neural Engineering (NER), 2019: IEEE, pp. 1-4, which is herein incorporated by reference.

Each feature vector outcome from the deep learning model typically contains thousands of rows, where each row corresponds to a feature extracted from the record by the deep learning model. Each of these large-scale, multi-dimensional feature vectors is then reduced to a smaller dimensional feature vector that includes a plurality of different features extracted from the physiological records. For example, the multi-dimensional feature vector may be reduced to a two-dimensional feature vector using a two-step process, where principal component analysis (sklearn.decomposition.PCA) is used to reduce the number of dimensions from a large number to a more manageable number; and then t-distributed stochastic gradient descent or t-distributed stochastic gradient neighbor embedding (sklearn.manifold.TSNE) is used to further reduce the number of dimensions to two. An example of a dimensionality reduction algorithm is disclosed in Dermatologist-level classification of skin cancer with deep neural networks, by Andre Esteva et al., Nature, published Feb. 2, 2017, Volume 542, pp 115-118, which is herein incorporated by reference. See also, S. A. Desai, T. Tcheng, and M. Morrell, "Transfer-learning for differentiating epileptic patients who respond to treatment based on chronic ambulatory ECoG data," in 2019 9th International IEEE/EMBS Conference on Neural Engineering (NER), 2019: IEEE, pp. 1-4.

A similarities algorithm is then applied to the feature vectors developed from the deep learning algorithm and the dimensional reduction algorithm to identify one or more clusters of similar physiological records. The similarities algorithm may be a clustering algorithm, such as k-means clustering. K-means clustering is a method of vector quantization, originally from signal processing, that is popular for cluster analysis in data mining. K-means clustering aims to partition n observations into k clusters in which each observation belongs to the cluster with the nearest mean, serving as a prototype of the cluster. This results in a partitioning of the data space into Voronoi cells. The problem is computationally difficult (NP-hard); however, efficient heuristic algorithms converge quickly to a local optimum. These are usually similar to the expectation-maximization algorithm for mixtures of Gaussian distributions via an iterative refinement approach employed by both k-means and Gaussian mixture modeling. They both use cluster centers to model the data; however, k-means clustering tends to find clusters of comparable spatial extent, while the expectation-maximization mechanism allows clusters to have different shapes. Alternatively, the Bayesian Gaussian Mixture Models may be used for clustering. This method of clustering has the advantage of implicitly deriving the number of clusters. Several clustering algorithms are described in Survey of Clustering Algorithm, by Rui Xu and Donald C. Wunsch, IEEE Transactions on Neural Networks, Institute of Electrical and Electronics Engineers, May 2005, which is herein incorporated by reference.

A human expert then visualizes one or a few physiological records within each cluster and assigns a label to those records. For example, the expert may select the physiological record closest to the center of a cluster. All of the other physiological records within this cluster are then automatically assigned the same label as the physiological record near the center of the cluster. Next, in a validation step, a sorting algorithm displays all the physiological records within the cluster in a sorted order. The records closest to the expert labelled physiological record, e.g., the selected record near the center of the cluster, are considered to be records most similar to the selected record and thus most likely to belong to the assigned label of the selected record. These records are in the upper portion of the sorted order. The records further from the expert labelled physiological record, e.g., the selected record near the center of the cluster, are considered to be records that may not belong to the assigned label of the selected record. These records are further down the sorted order. For each of the displayed records, the human expert either confirms the accuracy of the automatically assigned label or relabels the record with a correct label. By presenting the physiological records in this sorted order, the expert is expected to quickly confirm the records which are closest to the record that was manually assigned a label, and only has to increase his or her focus and attention on the physiological records which are toward the bottom end of the sorted list, i.e., further from the cluster center.

Having thus provided a general example of methods and systems that provide for a more manageable, less time consuming process for human expert labeling of large datasets of physiological records, a further detailed description follows.

Overview of System

Figure 1B:
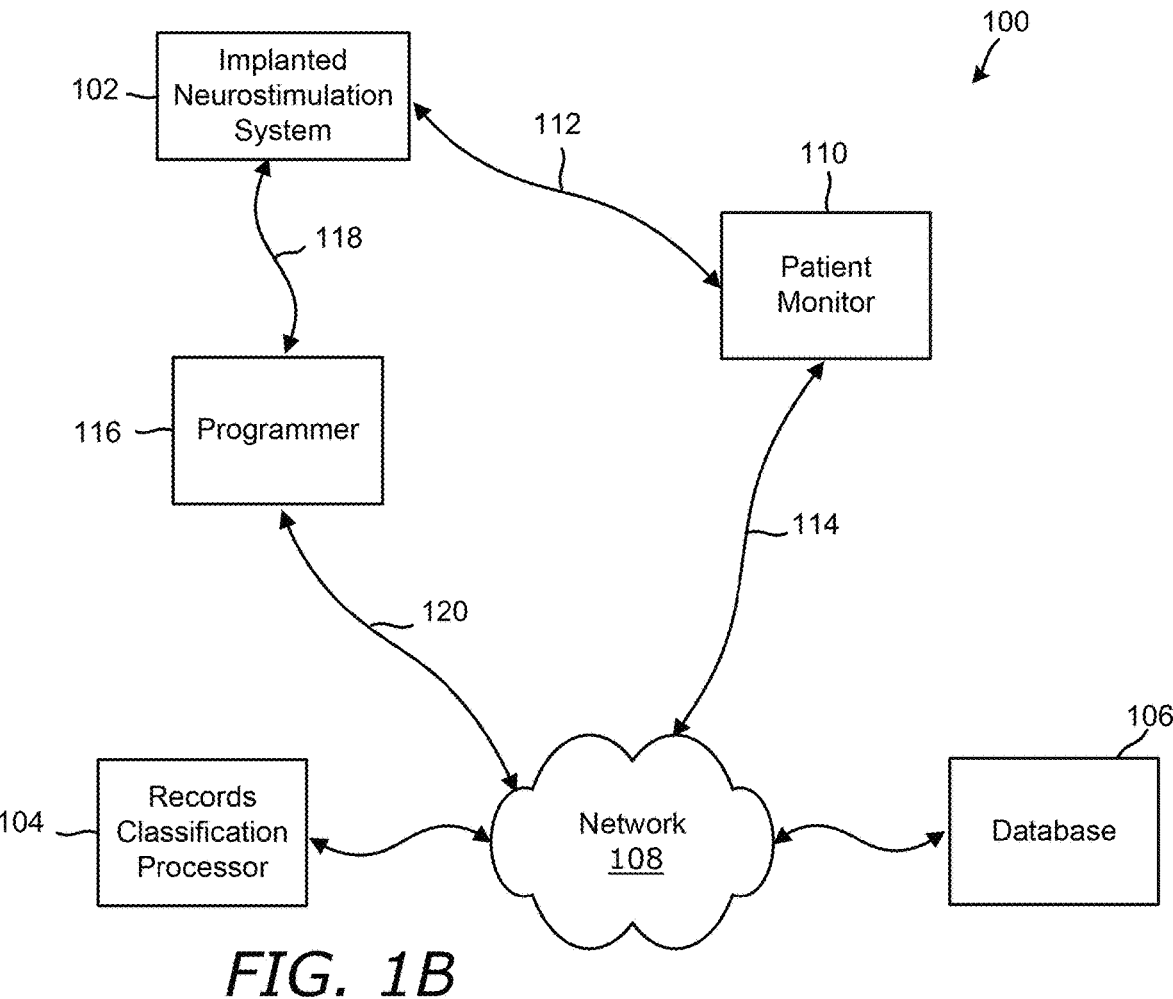
FIG. 1B is a block diagram illustration of a system, including an implanted neurostimulation system, a records classification processor, and other external equipment, that enable efficient and user-friendly expert labeling of physiological records, e.g., EEG records, recorded by the neurostimulation system.

FIG. 1B is a block diagram illustration of a system 100 in which deep learning models, dimensional reduction, and clustering algorithms are applied to physiological records, e.g., EEG records, to enable efficient expert labeling of such records. The system includes an implanted neurostimulation system 102, a records classification processor 104, and a database 106, each configured to provide and/or obtain physiological records over a network 108.

Physiological records corresponding to EEG records may be captured by the implanted neurostimulation system 102. As noted above, these EEG records may correspond to digitally recorded time series samples of electrocorticographic activity (e.g., a time series waveform). These EEG records may also be in another form or format derived from the time series samples. For example, an EEG record may be a spectrogram image or a time series waveform image of the brain electrical activity. (It will be appreciated that any time-series EEG can be represented as a spectrogram.) Alternatively, time-series waveforms may be directly used.

Other types of physiological information, e.g., pH levels, blood oxygen levels, neurotransmitters concentrations, heart rate, blood pressure, blood glucose levels, hormone levels, sleep states, posture, etc., may be captured and preserved by an implanted neurostimulation system 102 as physiological records. Collectively, the EEG records and other physiological records preserved by an implanted neurostimulation system 102 are part of a dataset for the patient in which the device is implanted. Non-physiological information, forms part of the dataset and may include records or files of patient demographics (e.g., age, gender), patient drug regimen (e.g., type of drug, dose, and time of day of dose), and patient clinical outcomes, such as the rate of electrographic seizure detection and electrographic seizure onset (e.g., as detected and recorded by the implanted neurostimulation system), the rate of clinical seizures (e.g., as reported in a seizure diary or detected based on accelerometer recordings).

The neurostimulation system 102 includes implantable components, namely, an active medical device or neurostimulator, and one or more electrode-bearing leads. The electrodes are configured to rest in or on neural tissue in the patient's brain when the leads are implanted. The neurostimulator may be configured to be implanted in or on the patient's cranium or elsewhere in the patient (e.g., pectorally). Once the neurostimulator is implanted, a proximal end of each lead is connected to the neurostimulator. The combination of the active implanted medical device and the implanted lead(s) is configurable to sense physiological signals from the brain and process and store records of the sensed signals. In this example, the physiological signals the electrodes sense and transmit through the lead(s) to the neurostimulator are electrocorticographic signals. The neurostimulator is configured to record samples or segments of the sensed EEGs, and to store them in a memory.

A neurostimulation system 102 may also be configured to sense and record other types of physiological signals besides EEG signals. To this end, the neurostimulation system 102 may include a lead as disclosed in U.S. Pat. No. 10,123,717, entitled Multimodal Brain Sensing Lead, which is herein incorporated by reference. Such a multimodal brain sensing lead may include: (1) macroelectrodes; (2) microelectrodes; (3) light emitters; and (4) photodetectors. Different sensing modalities of the implanted neurostimulation system 102 use the different transducers as follows: (1) neuronal field potential measurements are made using macroelectrodes; (2) neuronal single unit activity measurements are made using microelectrodes; (3) neuronal multi-unit activity measurements are also made using microelectrodes; (4) rheoencephalography measurements are made using macroelectrodes; (5) neurochemical and pharmaceutical voltammetric measurements are made using both macroelectrodes and microelectrodes; (6) optical blood flow and volume measurements are made using light emitters and photodetectors; and (7) optical blood oxygenation measurements are also made using light emitters and photodetectors.

Configured as such, the neurostimulation system 102 may sense and record signals indicative of blood oxygen level and blood volume in neural tissue, and signals indicative of chemical concentrations and neurotransmitter concentrations in neural tissue. From these signals, the neurostimulation system 102 may derive other physiological information. For example, blood flow, blood oxygenation, blood pressure, heart rate, and breathing rate may be estimated from blood oxygen and blood volume measurements, while pH levels and blood glucose levels may be derived from chemical concentrations and neurotransmitter concentrations.

The neurostimulation system 102 may also include one or more electrodes configured to sense electrical cardiac activity indicative of heart rate, a pressure sensor configured to provide signals indicative of blood pressure, an accelerometer configured to provide motion signals indicative of motion and the position of the patient. From these accelerometer signals, the implanted neurostimulation system 102 may derive other physiological information corresponding to clinical seizures, patient posture, and sleep state.

Other types of physiological information may be obtained and stored by the neurostimulation system 102 from sources independent of the neurostimulation system. For example, an external wearable device, e.g., patch, may include a sensor configured to sense and track cortisol levels, i.e., stress hormones, in sweat, while an external wearable device, e.g., watch, may include or a sensor configured to sense blood pressure. The physiological information from these external devices may be transmitted to the implanted neurostimulation system 102 for inclusion in the patient's dataset.

Records of physiological information may be generated by the neurostimulation system 102 based on an occurrence of an event or trigger. To this end, a neurostimulation system 102 can be configured to create an EEG record of a sensed EEG when an event the system is programmed to detect is detected. For example, the neurostimulation system 102 may be configured to detect an event corresponding to an electrographic seizure or the onset of an electrographic seizure from a sensed EEG, and to create an EEG record of the corresponding EEG signal spanning the time period 60 seconds before the event was detected and 30 seconds thereafter. The neurostimulation system 102 can also be programmed to create an EEG record of a sensed EEG at certain times of day (e.g., at noon and at midnight). These are sometimes referred to as "scheduled EEGs." In addition, then neurostimulation system 102 may be configured to store an EEG record upon some other trigger, such as when the patient swipes a magnet over the location on the patient's body at which the neurostimulator is implanted (the patient might be instructed to do this whenever he or she thinks a seizure is coming on).

The neurostimulation system 102 can also be programmed to designate EEG records based on the event that triggered its recording and to include that designation in the EEG record. For example, EEG records resulting from the detection of abnormal electrical activity, e.g., an electrographic seizure or the onset of an electrographic seizure, may be marked as such, while EEG records EEGs that do not reflect abnormal activity may be designated as baseline EEG records. Thus, for a given patient, a dataset may contain EEG records corresponding to what is happening in the patient's brain during and around when an event occurs, scheduled EEG records acquired at a particular time, and EEG records stored by the neurostimulator when a patient triggers storage with a magnet. Some of these EEG records, especially the ones recorded at the time of an event or when triggered by a magnet swipe, may reflect the patient's electrographic seizures. The dataset may include information about whatever triggered the neurostimulator to store a given EEG, such as the type of event (e.g., Pattern "A" or Pattern "B", a magnet swipe) or the time of day (e.g., scheduled EEG).

Typically, some sort of linkage or mapping among the various types of physiological information is provided in a dataset. To this end, each record may have one or more associated tags or parameters. For example, physiological records may have a time stamp that allows a set of physiological records at a given point in time to be located for processing. Physiological records may have a tag that indicates the basis, e.g., seizure detection, magnet swipe, scheduled time of day, for preserving the record. These tags allow a set of physiological records to be selected for processing based on a single criterion or a combination of criteria. Other tags may include day of capture, area of the brain at which the electrical activity was captured, basis for record creation (e.g., seizure detection, scheduled, patient initiated), characteristic of the record (e.g., power spectral density of EEG signal prior to stimulation).

Once created by a neurostimulation system 102, physiological records stored in the system can be relayed elsewhere, such as to an external component like the database 106 either directly or through an interim external component. For example, the patient monitor 110 can be used with an accessory (not shown) to establish a communications link 112 with the implanted neurostimulator (e.g., a short-range telemetry link), which allows records stored on the neurostimulator to be transmitted to the patient monitor 110. Once on the patient monitor, the physiological records can be transmitted to the database 106 via the network 108 (which may comprise a physical 114, WiFi, or cellular internet transmission).

Alternatively, the clinician may be provided with an external component, such as a programmer 116 that, like the patient monitor 110, is configured to establish a communications link 118 with the implanted neurostimulator. The programmer can be used by the clinician to adjust the programmable parameters of the neurostimulator (e.g., the parameters that govern the electrical stimulation waveform that is used for therapy). The programmer also may be used to display the real time EEG signals being sensed by the electrodes from the patient and to store them on the programmer. It also can be used like the patient monitor 110 to acquire physiological records that have been stored by the neurostimulator since the last time the neurostimulator was "interrogated" for those records by either a patient monitor 110 or programmer. As is the case with a patient monitor 110, once physiological records are stored on a programmer, they can be transmitted via the network 108 to other components of the system 100, such as the database 106 and/or the records classification processor 104 (either directly or via the database 106).

A neurostimulation system 102 may be configured to deliver electrical stimulation therapy in response to "events" that the neurostimulator is configured to detect. An event may be defined for the neurostimulator by setting the values of programmable detection parameters such that when a pattern corresponding to a pattern defined by the detection parameters occurs in the monitored EEG signals, the occurrence of that pattern will be detected as an event. Other implantable neurostimulation systems that might be used in the subject system may not have this feature of responsive neurostimulation at all or may not have it enabled.

The database 106 may store other information about a patient as the result of other algorithms or computations. For example, the system and methods for labeling EEG records disclosed herein may be applied to EEG records stored in the database 106 to classify or label the EEG records as evidencing an event or condition, such as those evidencing an electrographic seizure or onset of an electrographic seizure, and those evidencing no electrographic seizure activity at all or those considered to comprise a "baseline" condition for the patient.

While FIG. 1B illustrates a single implanted neurostimulation system 102 and patient monitor 110 and programmer 116, numerous neurostimulation systems implanted across a patient population may access the network 108 to provide patient physiological records and patient information to the records classification processor 104 and the database 106. Accordingly, the system 100 can provide access to tens of thousands of patient EEG records.

Physiological Records

As previously mentioned, the neurostimulator is configured to record an EEG signal as a series of digital data samples, and thus an EEG record typically is transmitted to the database 106 in this format to be stored. The time series of data samples of an EEG record can be used to generate or transform the EEG record into other formats. A non-exhaustive list of other possible EEG record formats includes a time-series waveform image of an EEG record or a Fourier or wavelet transformed version of the time-series EEG record. Each such EEG record also can be transformed (by well-known techniques) into other formats such as a spectrogram and used in that form. The database can be configured to create an EEG record in the desired form, e.g., time-series waveform or spectrogram, whenever the EEG record is called for by an algorithm (e.g., to display it to a clinician and/or use it in a deep learning model). Alternatively, the EEG records can be created in different formats and stored in those formats at the time they are received into the database 106. Systems and methods disclosed herein may operate on different formats of the EEG recording. For example, a deep learning model may process images (the EEG records as spectrograms).

As also previously mentioned, the neurostimulation system 102 may create other types or modalities of physiological records besides EEG records. The neurostimulation system 102 may sense and record signals indicative of blood oxygen level and blood volume in neural tissue, and signals indicative of chemical concentrations and neurotransmitter concentrations in neural tissue. From these signals, the neurostimulation system 102 may derive and record other physiological information. For example, blood flow, blood oxygenation, blood pressure, heart rate, and breathing rate may be estimated from blood oxygen and blood volume measurements, while pH levels and blood glucose levels may be derived from chemical concentrations and neurotransmitter concentrations.

Records Classification Processor

Figure 2:
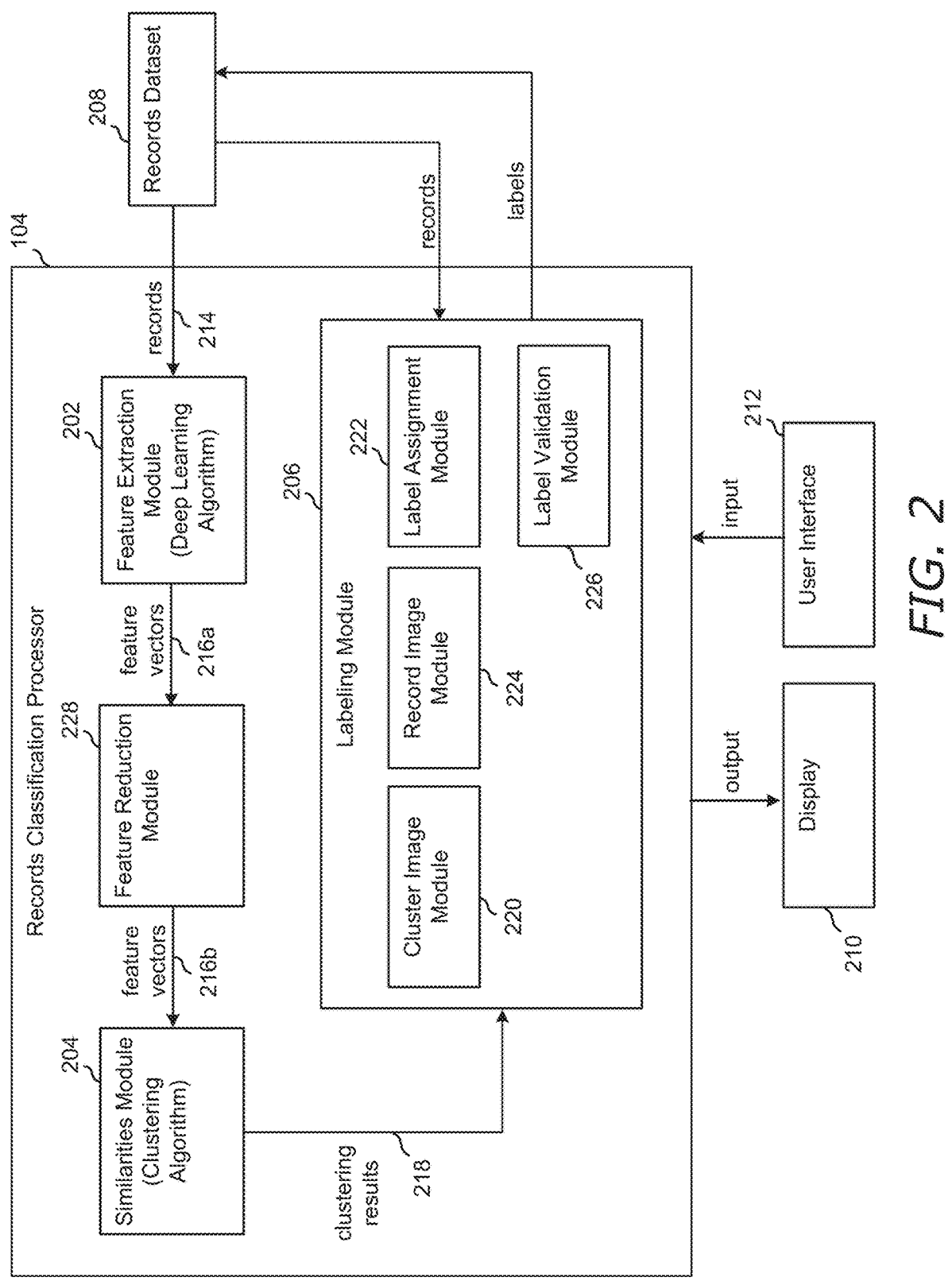
FIG. 2 is a block diagram illustration of a records classification processor of FIG. 1B that includes a feature extraction module.

FIG. 2 is a block diagram illustration of a records classification processor 104 included in the system 100 of FIG. 1B. Although shown as a separate component of the system 100 in FIG. 1B, the records classification processor 104 may be included in other system components. For example, the records classification processor 104 may be included in a programmer 116 or any other apparatus included in the system. While the following describes the operation of the records classification processor 104 with respect to physiological records corresponding to EEG records, it is understood that other modalities of physiological records may be used in place of EEG records or in combination with EEG records.

The records classification processor 104 includes a feature extraction module 202, a feature reduction module 228, a similarities module 204 and a labeling module 206. The records classification processor 104 is configured to interface with a records dataset 208, which may be part of the database 106, for purposes of receiving EEG records for processing and labeling. The records classification processor 104 also interfaces with a display 210 to enable the display of EEG records, the display of clusters of such records, and the display of classification labels. The records classification processor 104 also interfaces with a user interface 212 to receive inputs from expert users.

The physiological records to be labeled through the operation of the records classification processor 104 may include all records of a particular patient or all records across a patient population. Alternatively, the records to be labeled may be filtered or selected based on a common tag, common characteristic, or common piece of information associated with the records. For example, each record to be labeled may be tagged with same associated triggering event (e.g., long episode, scheduled, saturations) that resulted in the record being preserved by an implanted neurostimulation system 102 and stored in the database 106 or the same EEG classification (e.g., seizure, seizure onset, baseline, etc.). EEG classification may be determined based on the triggering event. For example, long episodes (this is a type of EEG) are long detections in EEG records and may be classified as electrographic seizures, while scheduled EEG records usually do not contain electrographic seizures, and are classified as baseline. Alternatively, EEG classification may be determined by an EEG classification algorithm included in the database or possibly in the feature extraction module 202. An example EEG classification algorithm that may be employed by the system is described in U.S. Patent Application Publication No. 2016/0228705, entitled "Seizure Onset Classification and Stimulation Parameter Selection," the disclosure of which is herein incorporated by reference.

In one filtering application, EEG records are processed in groups based on their associated triggering event. For example, EEG records having a "scheduled" trigger may sent through the deep learning model, the dimensionality reduction and the clustering algorithm processes of the records classification processor 104 first, followed by EEG records having a "long episode" trigger, followed by EEG records having a "saturation" trigger. In another filtering application, all EEG record trigger types are sent through the deep learning model and the dimensionality reduction processes of the records classification processor 104, with the clustering being performed separately on the feature vectors resulting from the dimensionality reduction based on their associated triggering event.

During label validation, the user may opt to only visualize a certain type of EEG record, e.g., scheduled EEG records only, long episode EEG records only, saturation EEG records only. This allows for a more efficient labeling process. For example, visualizing only the scheduled EEG records (which should typically contain only baseline EEG activity and hence should be labeled as baseline EEGs), quickly helps identify any outliers, e.g., any scheduled EEG records which captured an electrographic seizure by chance. The user may then quickly relabel the outliers correctly as electrographic seizures, and confirm the accuracy of all other EEG records.

FIG. 3 is a flowchart of a method of classifying records of physiological information based on expert label assignments. The methods may be performed by the records classification processor 104, in conjunction with other components of the system 100 of FIG. 1B. While the following describes a method of classifying records with respect to physiological records corresponding to EEG records, it is understood that other modalities of physiological records may be used in place of EEG records or in combination with EEG records.

At block 302, the records classification processor 104 applies a deep learning model and a dimensionality reduction process to each of a plurality of records to derive a corresponding plurality of feature vectors. To this end, the feature extraction module 202 of the records classification processor 104 receives a plurality of records 214 from the records dataset 208. In one embodiment, each of the plurality of records 214 is a single record, e.g., one of the EEG sub-records or channels shown in FIG. 1A. The deep learning model is applied to each single record to extract features therefrom, which features in turn are subjected to a dimensionality reduction process to derive a reduced dimensional feature vector. In another embodiment, each of the plurality of records 214 is a group of records, e.g., the combination of the 4 EEG sub-records or channels shown in FIG. 1A. The deep learning model is applied to the group of records as a collective whole to extract features therefrom, which in turn are subjected to a dimensionality reduction process to derive a reduced dimensional feature vector.

The plurality of records 214 may be any single modality of record, or a combination of different modalities of records. The modalities of records may include electrical activity of the brain in the form of time series waveforms or spectrograms stored as EEG records, neural tissue motion in the form of an accelerometer record, heart rate measurements in the form of an EKG waveform record, blood profusion in the form of a blood flow measurements at one or more instance in time, blood oxygenation in the form of blood oxygenation values at one or more instances in time, or neuromodulator concentrations in the form of measures of concentration at one or more instance in time.

The plurality of records 214 may or may not have a common parameter or tag, e.g., time stamp, day of capture, area of the brain at which the electrical activity was captured, basis for record creation (e.g., seizure detection, scheduled, patient initiated), or characteristic of the record (e.g., power spectral density of EEG signal prior to stimulation). In other words, in some cases records stored in the database 106 are selected for inclusion in the plurality of records 214 based on a criteria or filtering. For example, the plurality of records 214 may be records in the database 106 that were recorded on the same day, or from the same area of the brain, or that have a power spectral density within a specified range. The records may also be filtered based on non-physiological information. For example, the plurality of records 214 may be records in the database 106 that were recorded by a neurostimulation system 102 associated with a patient within a specified age range, or a patient that is being treated with a particular drug, or a patient of a specified sex or race.

It is understood that the plurality of records 214 may be selected based on a single criterion or a combination of criteria. For example, the plurality of records 214 may be of the same modality (e.g., all are EEG records) but do not necessarily have a common tag or parameter. The plurality of records 214 may have a common tag (e.g., all were captured at the same time) but are not necessarily of the same modality. The plurality of records 214 may be different modalities (e.g., some are EEG records, some are motion record obtain from an accelerometer) but have a common tag (e.g., all were captured at the same time). The plurality of records 214 may be of the same modality (e.g., all are EEG records) and have a common tag (e.g., all were captured at the same time).

After receiving the records 214, the feature extraction module 202 applies a deep learning model to each of the records. The deep learning model is configured to extract the different features from the record to thereby derive a feature vector 216.

Each feature vector 216a contains thousands of rows, where each row corresponds to a feature extracted from the record by a deep learning model. These large-scale, multi-dimensional feature vectors are subjected to a dimensional reduction. To this end, the feature reduction module 228 of the records classification processor 104 receives each of the large-scale, multi-dimensional feature vectors and applies a dimensional reduction algorithm to each vector to derive a corresponding smaller dimensional feature vector 216b.

Figure 4:
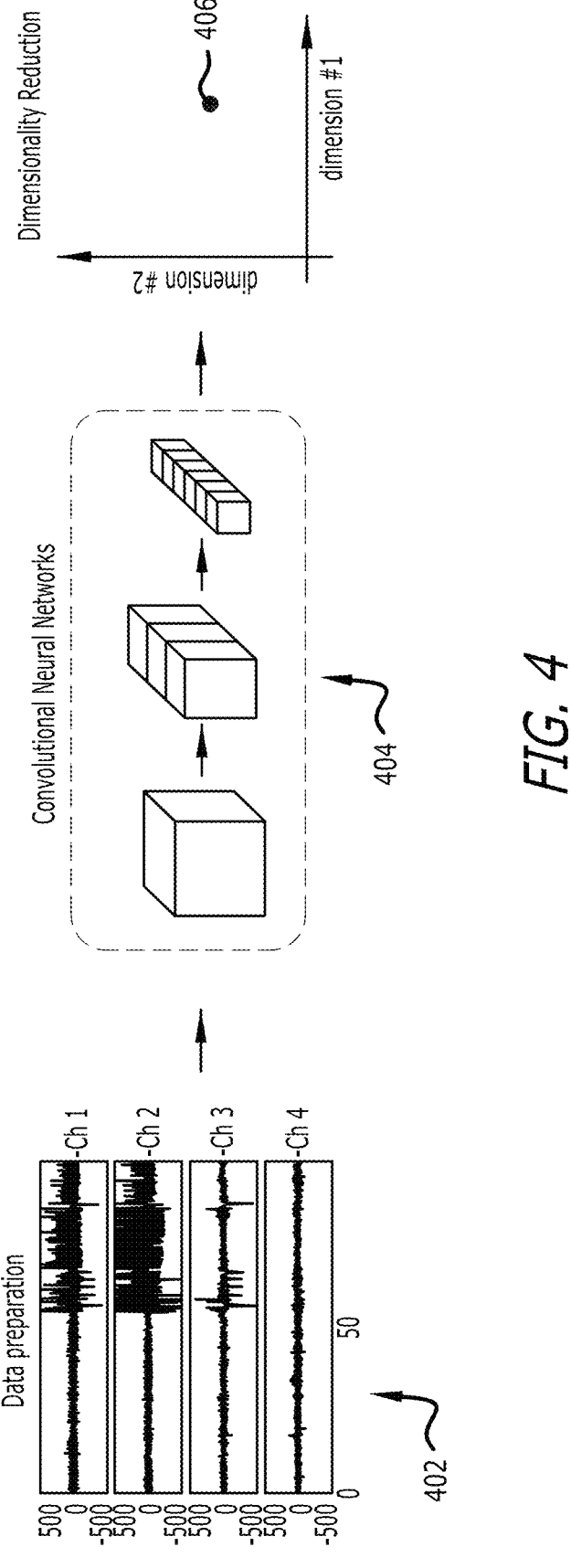
FIG. 4 is an example operation of the feature extraction module of FIG. 2 on a physiological record corresponding to an EEG record.

An example operation of the feature extraction module 202 and feature reduction module 228 on an EEG record is provided by FIG. 4. Here, the EEG record 402 being processed corresponds to a time series representation of electrical activity of the brain as simultaneously sensed by four different channels, Ch1, Ch2, Ch3 and Ch4, of an implantable neurostimulator. Thus, the EEG record 402 includes a set consisting of four channels of EEG data, each visualized as a separate time series waveform. Each of the four separate time series waveforms (and their corresponding EEG data) represent a sub-record of the EEG record 402; and collectively the four separate time series waveforms (and their corresponding EEG data) represent the entirety of the EEG record 402.

A deep learning model 404 is applied to the EEG record 402 to extract features. Assuming the aim of the records labeling process is to assign a label to the EEG record as a whole (as opposed to each individual channel record), each sub-record of the EEG record 402 is run through the deep learning model 404, and the features extracted for each sub-record are concatenated. For example, if each sub-record results in 100,000 features and there are four sub-records, the resulting concatenated feature set for the entirety of the EEG record 402 would consist of 400,000 features. In one configuration, each sub-record of the EEG record is transformed to a spectrogram and then run through the deep learning model 404.

The deep learning model 404 used for feature extraction may be, for example, a pretrained convolution neural network (CNN), autoencoders, recurrent neural network (RNN), or a deep neural network configured to derive features from the records. These types of deep learning models are described, for example, in Deep Learning, by Yann LeCun, Yoshua Bengio and Geoffrey Hinton, Nature, published May 27, 2015, Volume 521, pp 436-444. Other types of deep learning model that may be used for feature extraction include pretrained deep learning models, such as AlexNet or Inception-v3. AlexNet is described in ImageNet Classification with Deep Convolutional Neural Networks, by A. Krizhevsky, I. Sutskever, and G. Hinton, included in Advances in Neural Information Processing Systems 25 (NIPS 2012), available at http://papers.nips.cc/paper/4824-imagenet-classification-with-deep-convolutional-neural-networks. Other types of models may be used to extract features. For example, a deep learning model may be trained from scratch on a relevant problem (for example, a deep learning model may be trained to classify different types of EEG records) and applied to this problem for feature extraction. Alternatively, handcrafted features such as spectral power, Fast Fourier Transform or wavelets, may be extracted from the EEG records.

The large-scale, multi-dimensional extracted features are processed by a dimensionality reduction algorithm to reduce the dimensions of the extracted features to a two-dimensional feature vector 406 which can be easily visualized. As described above, the dimensionality reduction process may be done by, for example, principal component analysis and/or t-distributed stochastic gradient descent. An example of a dimensionality reduction algorithm is disclosed in Dermatologist-level classification of skin cancer with deep neural networks, by Andre Esteva et al., Nature, published Feb. 2, 2017, Volume 542, pp 115-118. Some other examples of dimensionality reduction algorithms are LLE (locally Linear Embedding), Multidimensional Scaling (MDS), Isomap and LDA (Linear Discriminant Analysis (LDA).

Alternatively, assuming the aim of the records labeling process is to assign a label to individual sub-records (as opposed to the EEG record as a whole), each sub-record of the EEG record 402 is processed by the deep learning model 404 and the extracted features are then sent through the dimensionality reduction process without being concatenated. In one configuration, each sub-record is transformed to a spectrogram and then run processed by the deep learning model 404.

Figures 5A, 5B, 5C:
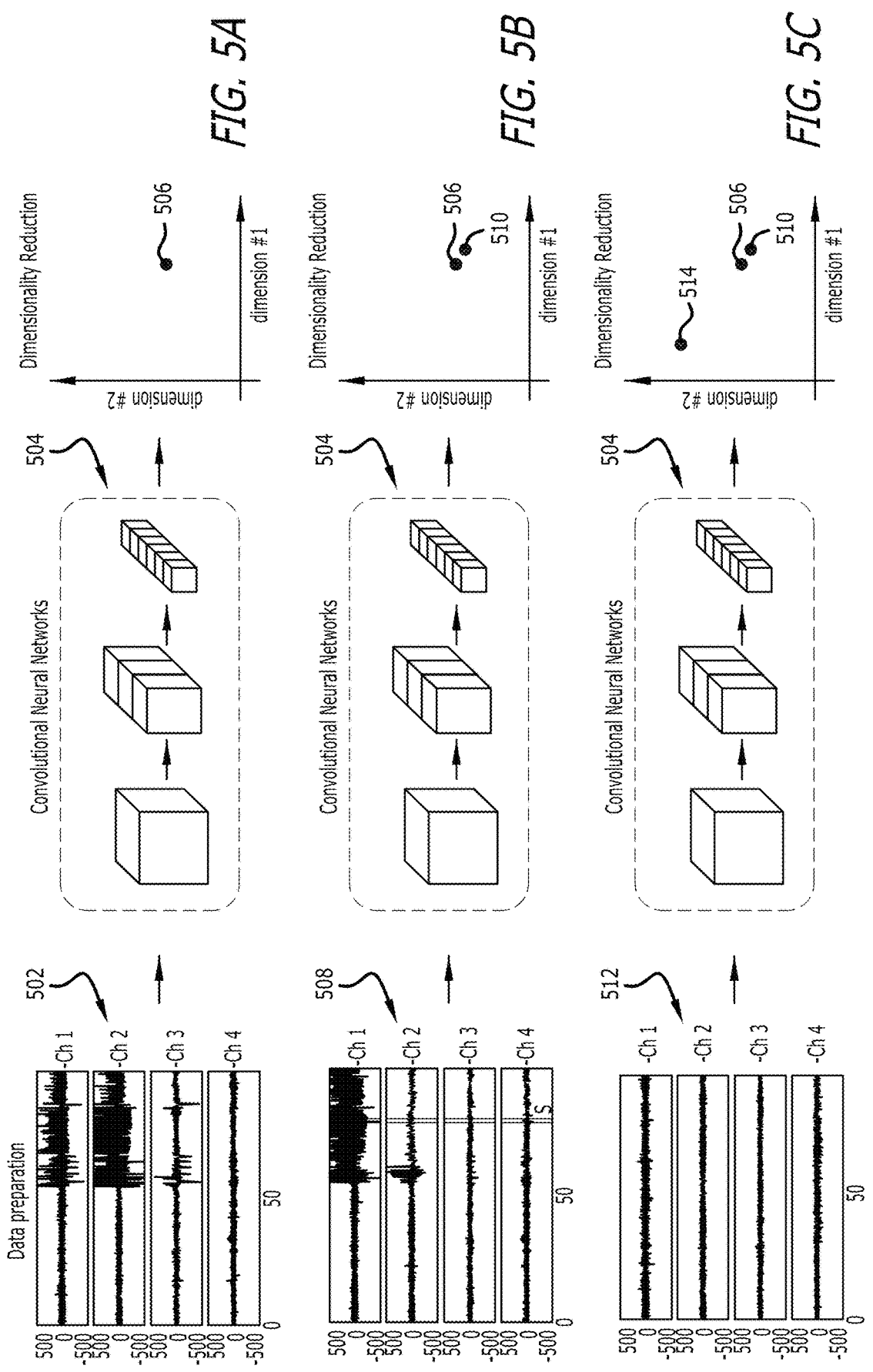
FIGS. 5A, 5B and 5C is another example operation of the feature extraction module of FIG. 2, which illustrate feature extraction and dimensionality reduction for a series of EEG records from a same patient.

Another example operation of the feature extraction module 202 is provided by FIGS. 5A, 5B and 5C, which illustrate feature extraction and dimensionality reduction for a series of EEG records from a same patient, where each EEG record includes a set consisting of four channels of EEG data. In FIG. 5A, a deep learning model 504 is applied to a first EEG record 502 to extract features. The extracted features are then sent through a dimensionality reduction process to reduce the dimensions of the extracted features to a two-dimensional feature vector 506.

In FIG. 5B, the deep learning model 504 is applied to a second EEG record 508 to extract features. The extracted features are then sent through a dimensionality reduction process to reduce the dimensions of the extracted features to a two-dimensional feature vector 510. In the reduced two-dimensional space, the feature vector 510 for the second EEG record 508 is located close to the feature vector 506 for first EEG record 502.

In FIG. 5C, the deep learning model 504 is applied to a third EEG record 512 to extract features. The extracted features are then sent through a dimensionality reduction process to reduce the dimensions of the extracted features to a two-dimensional feature vector 514. In the reduced two-dimensional space, the feature vector 514 for the third EEG record 512 is located far from the feature vectors 506, 510 for the first and second EEG records 502, 508

The foregoing process may be repeated multiple times, once for all EEG records collected from a given patient, to provide one feature vector or data point for each EEG record in the reduced two-dimensional feature space. Accordingly, if a patient has a total of 1000 EEG records stored and every EEG record is processed as described above the records classification processor 104 will end up with 1000 data points in the reduced two-dimensional feature space.

Returning to FIG. 3, at block 304, the records classification processor 104 applies a similarities algorithm to the plurality of feature vectors to form a plurality of clusters, wherein each cluster comprises a set of feature vectors having a common measure of similarity. To this end, the feature extraction module 202 provides the plurality of feature vectors 216 to the similarities module 204 of the records classification processor 104. The similarities module 204 applies a similarities algorithm, such as a clustering algorithm, to the feature vectors 216 to identify records having a measure of similarity that meets a predetermined similarity criterion of the similarities algorithm.

As described above, the clustering algorithm may be k-means clustering, spectral clustering, or Gaussian mixed models. Depending on the clustering algorithm used, a pre-specified number of clusters may or may not be returned. For example, with k-means clustering, the end user may be able to specify the number of clusters whereas with a Bayesian Gaussian Mixed Model, the algorithm will find a reasonable number of clusters.

Figure 6:
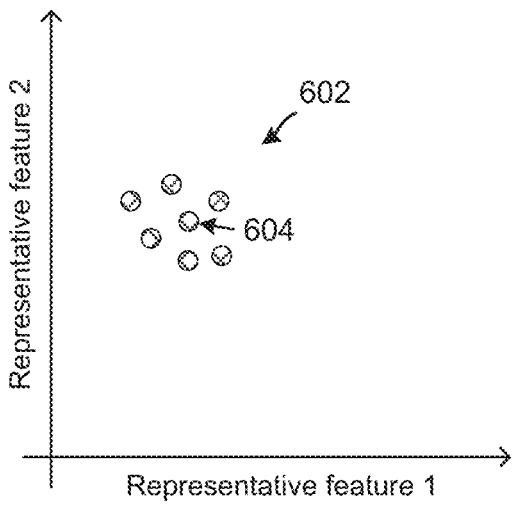
FIG. 6 is a graphical representation of a cluster including plurality of feature vectors, each defined by a pair of features extracted by a deep learning model.

An example operation of the similarities algorithm within the context of clustering is provided by FIG. 6, which is a graphical representation of a group of two-dimensional feature vectors 602, and a centroid feature vector 604 among the group of vectors. The centroid feature vector 604 and surrounding feature vectors 602 are selected for inclusion in a cluster based on their cluster membership as determined by a clustering algorithm.

Figure 7:
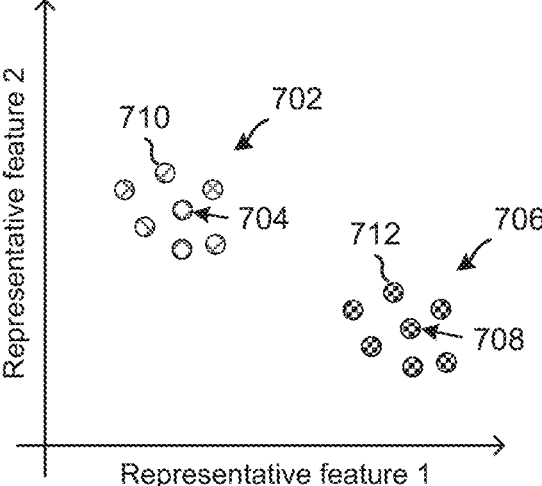
FIG. 7 is a graphical representation of two clusters, each including a plurality of feature vectors defined by a pair of features extracted by a deep learning model.

Another example operation of the similarities algorithm in the context of clustering is provided by FIG. 7, which is a graphical representation of a first cluster 702 of two-dimensional feature vectors, and a centroid feature vector 704 among this cluster of vectors, and a second cluster 706 of feature vectors and a centroid feature vector 708 among this cluster of vectors. The feature vectors 710 in the first cluster 702 are selected for inclusion in that cluster based on their cluster membership as determined by a clustering algorithm. Likewise, the feature vectors 712 in the second cluster 706 are selected for inclusion in that cluster based on their cluster membership as determined by a clustering algorithm.

Figure 8:
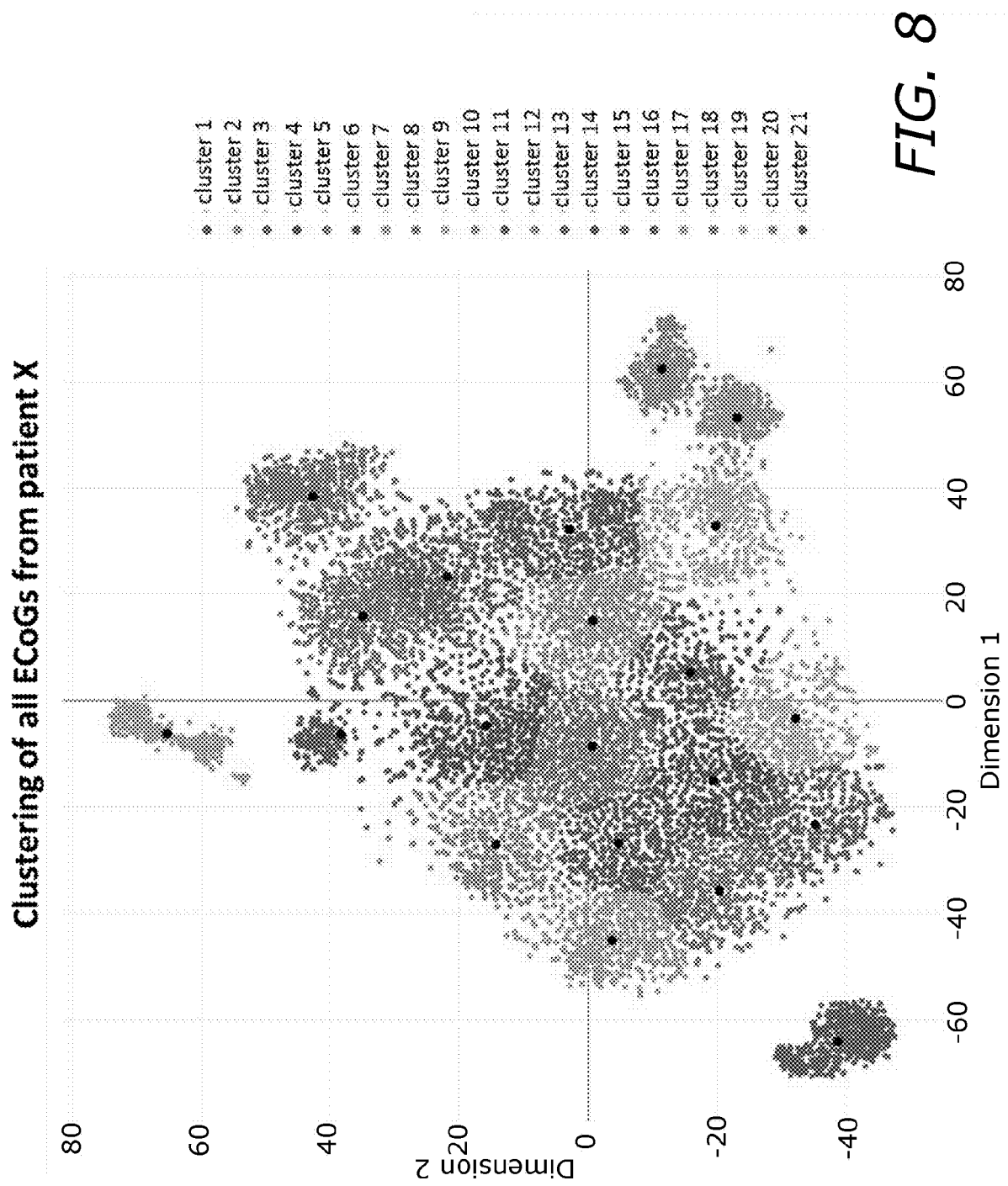
FIG. 8 is a graphical representation of a display illustrating a plurality of clusters, each formed by a set of feature vectors, that results from the operation of the similarities module and labeling module of FIG. 2.

Returning to FIG. 3, at block 306, the records classification processor 104 provides an output comprising information that enables a display of one or more of the plurality of clusters. To this end, the similarities module 204 provides clustering results 218 to the labeling module 206. The labeling module 206 includes a cluster image module 220 that provides an output to the display 210 that enables a visual display based on the clustering results. For example, the output may enable the display 210 to display all of the clusters formed by the similarities module 204, such as shown in FIG. 8. In other configurations, the output may enable the display 210 to display a subset of the clusters.

An example display enabled by the output of the similarities module 204 is provided by FIG. 8, which illustrates a plurality of clusters, each formed by a set of feature vectors. In this example, 11,000 EEG records were applied to a deep learning model as described above, to obtain 11,000 corresponding feature vectors. These features vectors were then applied to a clustering algorithm, e.g., k-means clustering, to find twenty-one clusters. Each cluster is shown with a different color.

At block 308, the records classification processor 104 enables a mechanism for selecting at least one feature vector within a selected cluster of the one or more of clusters. To this end, the labeling module 206 includes a label assignment module 222 configured to enable, for example, a graphical user interface that allows for a user to select through the user interface 212, a graphical representation of a feature vector on the display 210. Based on the input selection received through the user interface 212, the label assignment module 222 identifies a feature vector for further processing.

At block 310, the records classification processor 104 provides an output comprising information that enables a display of the EEG record corresponding to the selected feature vector. To this end, the labeling module 206 includes a record image module 224 that provides an output to the display 210 that enables a visual display of the EEG record corresponding to the selected feature vector. The EEG record may be obtained by the record image module 224 from the records dataset 208 using a record identification associated with the selected feature vector. For example, the record image module 224 may send the record identification to the records dataset 208 with a request for a copy of the record.

At block 312, the records classification processor 104 enables a mechanism for assigning a label to the displayed EEG record. To this end, the label assignment module 222 may be configured to enable a graphical user interface that allows for a user to select through the user interface 212, a label from a predefined set of labels. Alternatively, the label assignment module 222 may be configured to enable a graphical user interface that accepts text entry of the label, or an audio interface that accepts and recognizes an auditory delivery of the label. In any case, the label assigned by the user to the displayed EEG record may be referred to hereon as an "expert label."

At block 314, the records classification processor 104 automatically assigns the expert label to the EEG records corresponding to the remaining feature vectors in the selected cluster. In cases where only one feature vector is selected in block 308, the label assignment module 222 is configured to automatically associate or link the expert label with the EEG record of each feature vector in the cluster based only on the expert labeling of the one selected EEG record.

Alternatively, in cases where two or more feature vectors are selected in block 308, the label assignment module 222 is configured to automatically associate the expert label with the EEG records of the other feature vectors in the cluster only when the same expert label has been assigned to each of the displayed EEG records of the selected feature vectors. If different labels are assigned to the expert labeled records, then the label assignment module 222 will obtain one or more additional expert labels for one or more additional EEG records associated with the cluster, and then automatically associate the label that was most often assigned by the user, with the EEG records of the other feature vectors in the cluster. The label assignment module 222 may obtain one or more additional expert labels by either automatically displaying one or more EEG records of the cluster and prompting the user to assign an expert label, or by prompting the user to select and label another feature vector within the cluster.

At block 316, the records classification processor 104 validates the automatically assigned labels. To this end, for each EEG record having an automatically assigned label, the record image module 224 provides an output to the display 210 comprising information that enables a display of the EEG record together with its automatically assigned label. The label validation module 226, in turn, enables a mechanism for confirming the accuracy of the automatically assigned label. To this end, the label validation module 226 may be configured to enable a graphical user interface that allows for a user to select through the user interface 212, a confirm or no confirm indication. For example, selectable "yes" (confirmed) and "no" (not confirmed) buttons may be displayed. Alternatively, the label validation module 226 may be configured to enable a graphical user interface that accepts Y (yes) and N (no) text entry of the confirmation indication through the user interface, or an audio interface that accepts and recognizes an auditory delivery of a yes/no confirmation.

In cases where an assigned label for an EEG record is not confirmed, the label validation module 226 may be configured to enable a mechanism for assigning a different label to that EEG record. To this end, the label validation module 226 may be configured to enable a graphical user interface that allows for a user to select through the user interface 212, a label from a predefined set of labels. Alternatively, the label validation module 226 may be configured to enable a graphical user interface that accepts text entry of the label, or an audio interface that accepts and recognizes an auditory delivery of the label. In any case, the label assigned by the user to the displayed record may be referred to hereon as an "expert label."

In cases where an assigned label for an EEG record is not confirmed, the label validation module 226 may be configured to automatically assign or associate the feature vector of that EEG record to an adjacent cluster in the plurality of clusters. In one configuration, the adjacent cluster to which a feature vector is associated is selected randomly from all the clusters that are adjacent the cluster with which the feature vector is currently associated. In another configuration, the adjacent cluster to which a feature vector is automatically moved is selected based on a measure of similarity between the feature vector of the record and the centroid feature vectors of clusters surrounding the cluster with which the feature vector is currently associated. For example, the measure of similarity may be a measure of the distance between the feature vector of the record and the centroid feature vector of each surrounding cluster, and the feature vector is moved to the surrounding cluster having the centroid feature vector that resulted in the shortest distance. This distance metric may be computed using distance computing algorithms such as Euclidean distance, Minkowski distance, Chebyshev distance.

In one configuration, the records are validated in an order that is determined based on a measure of similarity between the feature vector of the EEG record that was manually labeled by the expert and all other feature vectors in the cluster. For example, a measure of similarity may correspond to a distance between each of the remaining feature vectors in the selected cluster and the feature vector corresponding to the expert labeled EEG record. This distance metric may be computed using distance computing algorithms such as Euclidean distance, Minkowski distance, Chebyshev distance, etc. In this case, the order of record validation is from shortest distance to longest distance. This provides for a more efficient labeling process in that the automatically assigned labels for records corresponding to feature vectors that are closer to the feature vector of the expert labeled EEG record are likely to be accurate, thus allowing the user to quickly review and confirm these records. As the distance from the feature vector of the expert labeled EEG record increases, more time may be needed to confirm the accuracy of the automatic labeling.

Figure 9A:
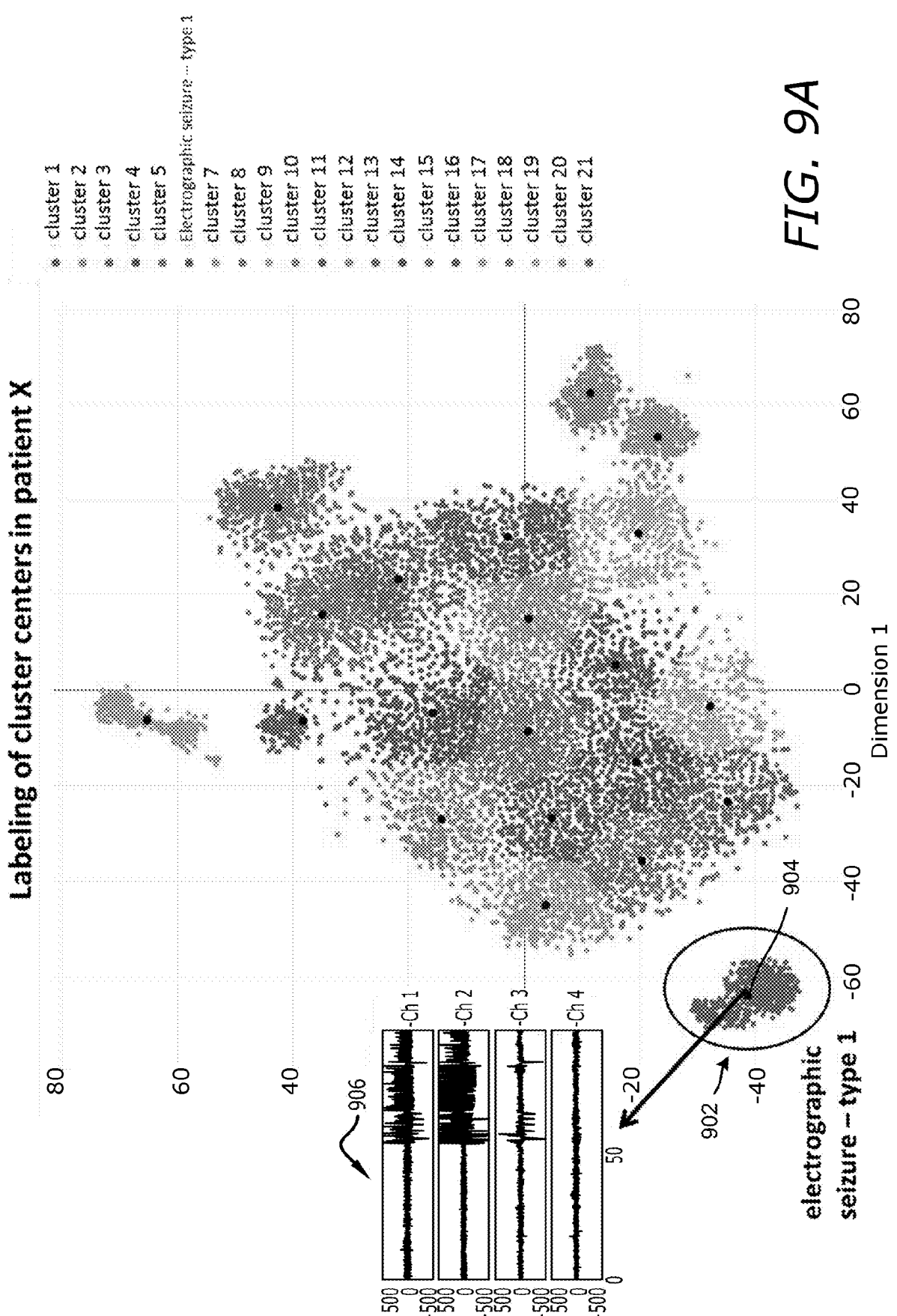
FIG. 9A is a graphical representation of the display of FIG. 8 illustrating an "electrographic seizure—type 1" label for a displayed EEG record and its associated cluster, that results from the operation of the labeling module of FIG. 2.
Figure 9B:
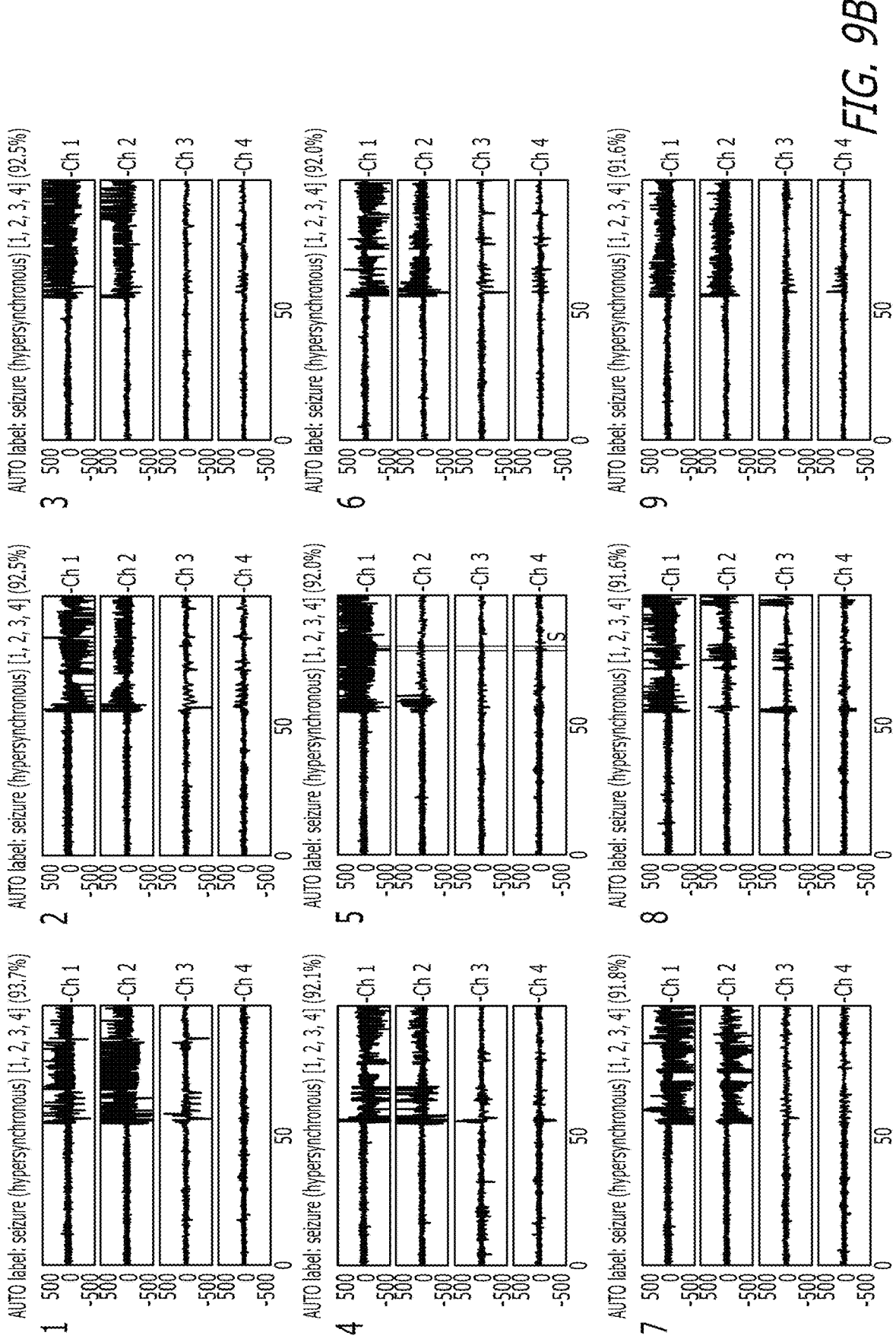
FIGS. 9B and 9C are graphical representations of EEG records associated with the cluster of FIG. 9A in a sorted order that results from the operation of the label validation module of FIG. 2.
Figure 9C:
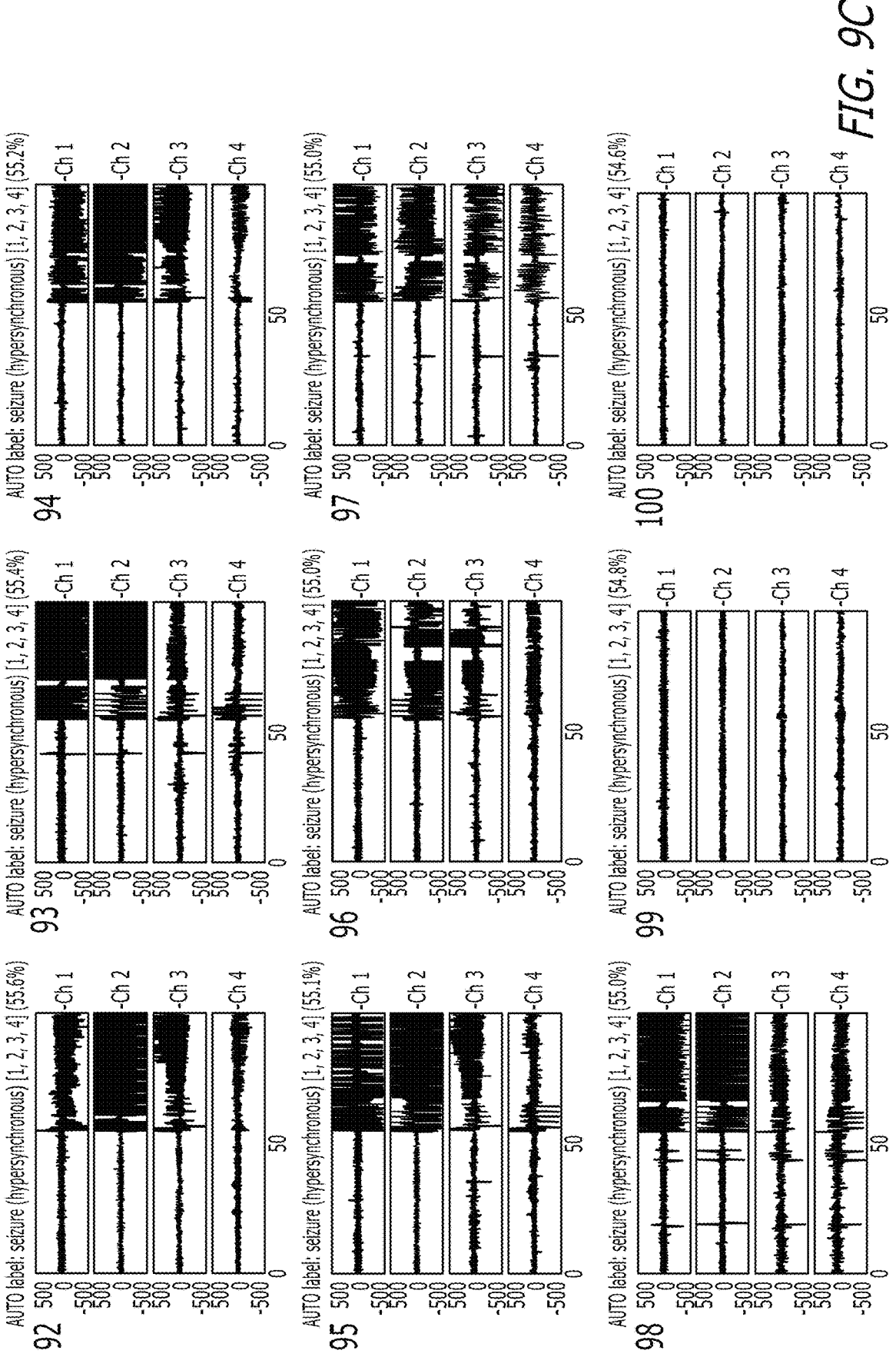

An example of the feature vector selection, automatic label assignment, and label validation operations of blocks 308 through 316 is illustrated in FIGS. 9A, 9B and 9C. Beginning with FIG. 9A, a feature vector within a cluster 902 is selected by a user though a graphical user interface. The selected feature vector may be the centroid or center vector 904 of the cluster 902 or a feature vector that is close to the center vector of the cluster. In the example shown in FIG. 9A, the center vector 904 is displayed as a large dot.

Upon selection of the feature vector 904, the EEG record 906 corresponding to the selected feature vector is displayed on the display 210 screen. The user views the EEG record 906 and provides a label for that record, through the user interface 212, in one of the manners described above. In the example shown in FIG. 9A, the records classification processor 104 received an "electrographic seizure—type 1" label for the displayed EEG record 906. At this stage, the records classification processor 104 may automatically assign the same label to the remaining EEG records associated with the cluster 902.

Alternatively, the records classification processor 104 may request user review and expert labeling of one or more additional EEG records associated with the cluster 902 before automatically assigning labels to the rest of the EEG records associated with the cluster. Upon completion of the automatic labeling, the automatic labels are validated.

Label validation includes generating a sorted order in which the EEG records associated with a cluster are to be displayed and validated. Assuming the cluster in FIG. 9A, contains about 100 EEG records, a sorted list of the 100 EEG records would be generated, With reference to FIGS. 9B and 9C, the first nine EEG records of the 100 records are shown in FIG. 9B and identified by numbers 1 through 9, while the last nine EEG records are shown in FIG. 9C and identified by numbers 92 through 100. EEG record #1 corresponds to the EEG record that was manually assigned the expert label. This EEG record also corresponds to the center vector 904 that is at the center of the cluster 902. EEG record #1 is followed in order by the rest of the EEG records within the cluster 902 based on distance from the center vector 904. Accordingly, the EEG records displayed at the top of the list, such as the ones shown in FIG. 9B, are closest in distance to the center vector 904 and thus are the ones most similar to EEG record #1. The EEG records further down the order, such as the ones shown in FIG. 9C, are ones that are least similar to the EEG record #1.

Thus, FIG. 9B shows an example first validation display page with the top nine EEG records in the sorted list. The user will be able to quickly verify whether the labels automatically assigned to the top nine EEG records in the sorted list are accurate and move on to the next display EEG records. In the last validation page illustrated in FIG. 9C, it can be seen that EEG record #99 and EEG record #100 do not look very much like the rest of the EEG records in this cluster. Accordingly, the user will be able to select these EEG records and reclassify/relabel them as something else. For example, in the case of FIG. 9C, the last two EEG records may be labeled as interictal epileptiform or baseline EEG records.

Figure 10A:
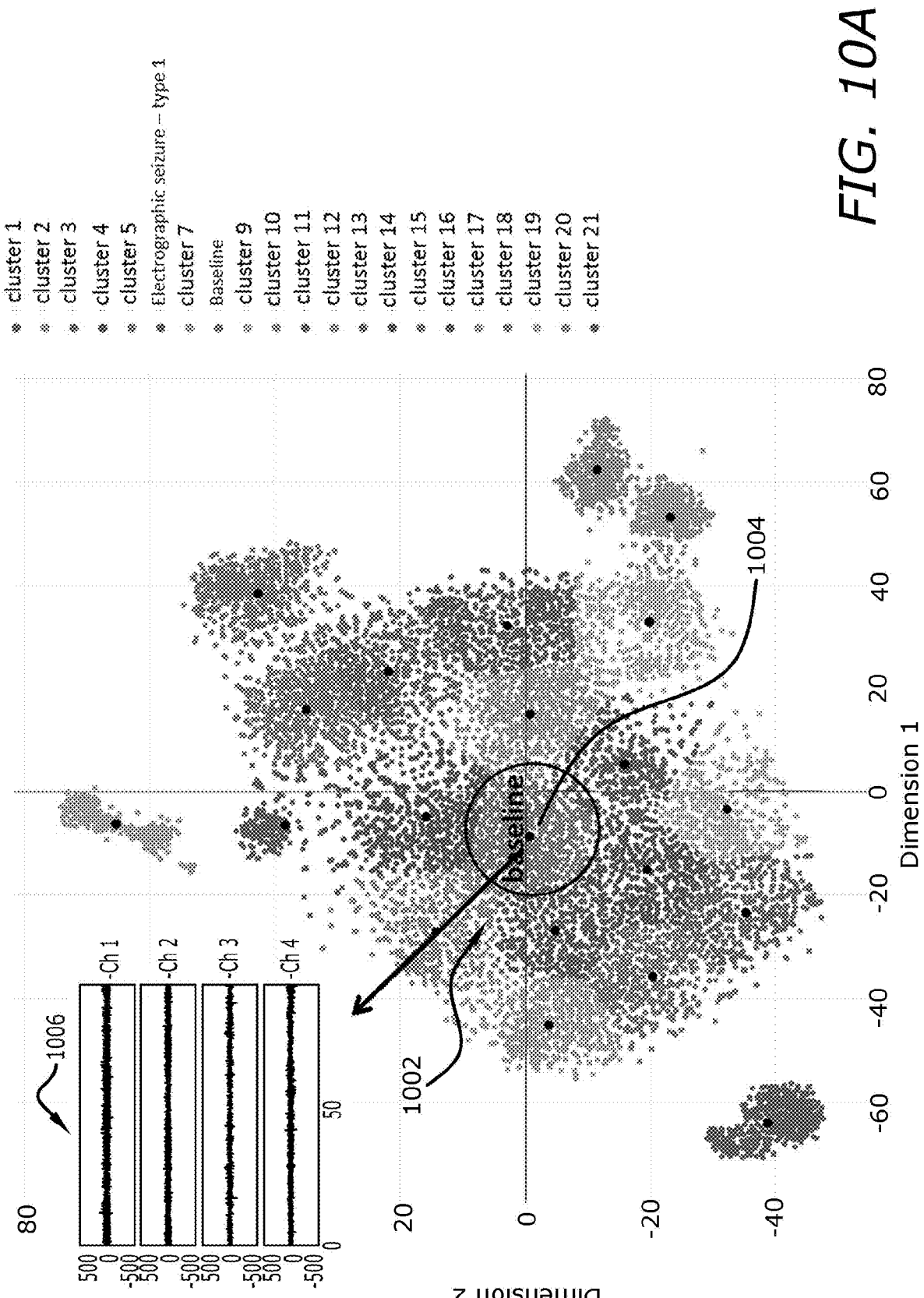
FIG. 10A is a graphical representation of the display of FIG. 8 illustrating a "baseline" label for a displayed EEG record and its associated cluster, that results from the operation of the labeling module of FIG. 2.
Figure 10B:
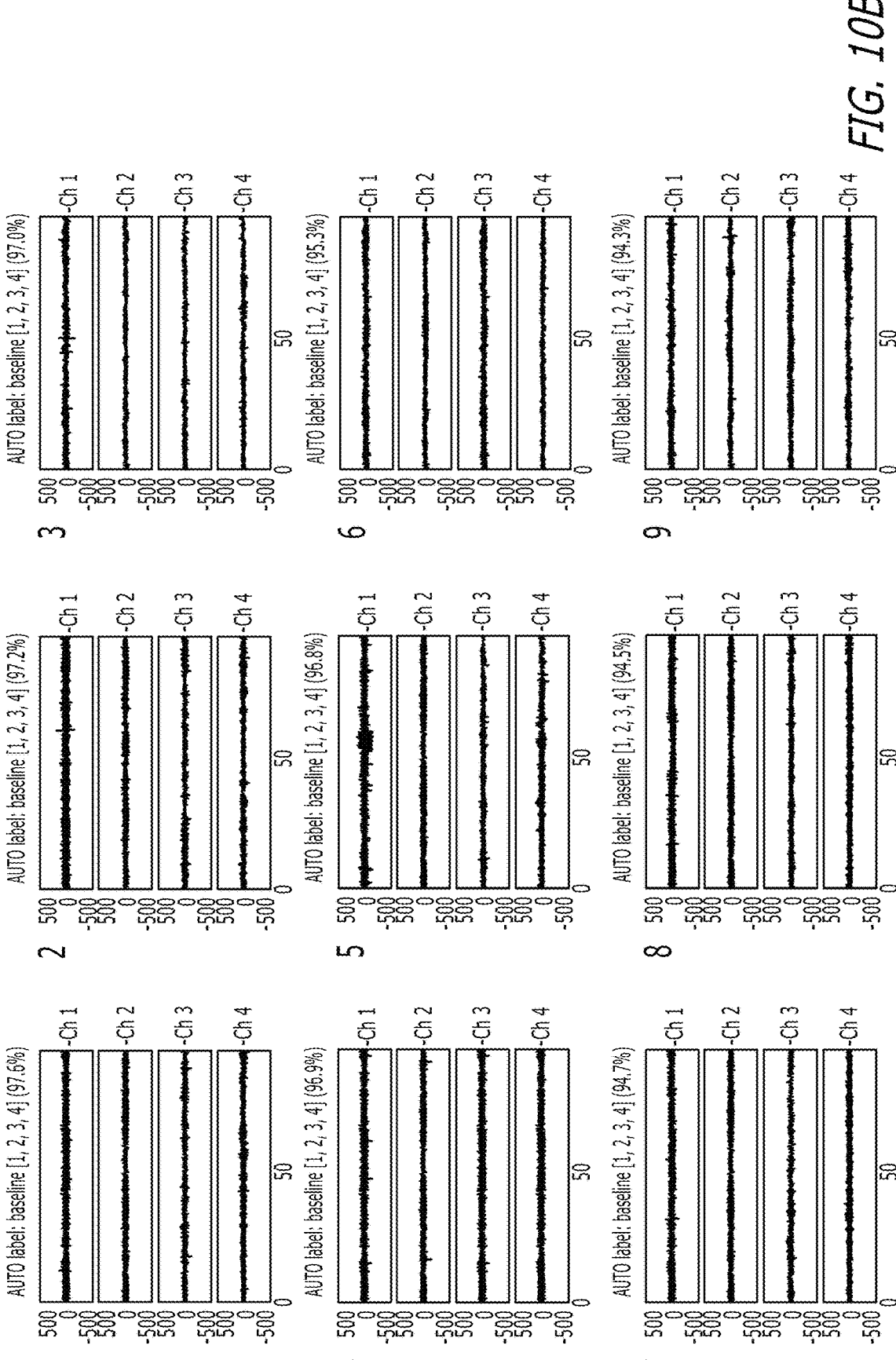
FIGS. 10B and 10C are graphical representations of EEG records associated with the cluster of FIG. 10A in a sorted order that results from the operation of the label validation module of FIG. 2.
Figure 10C:
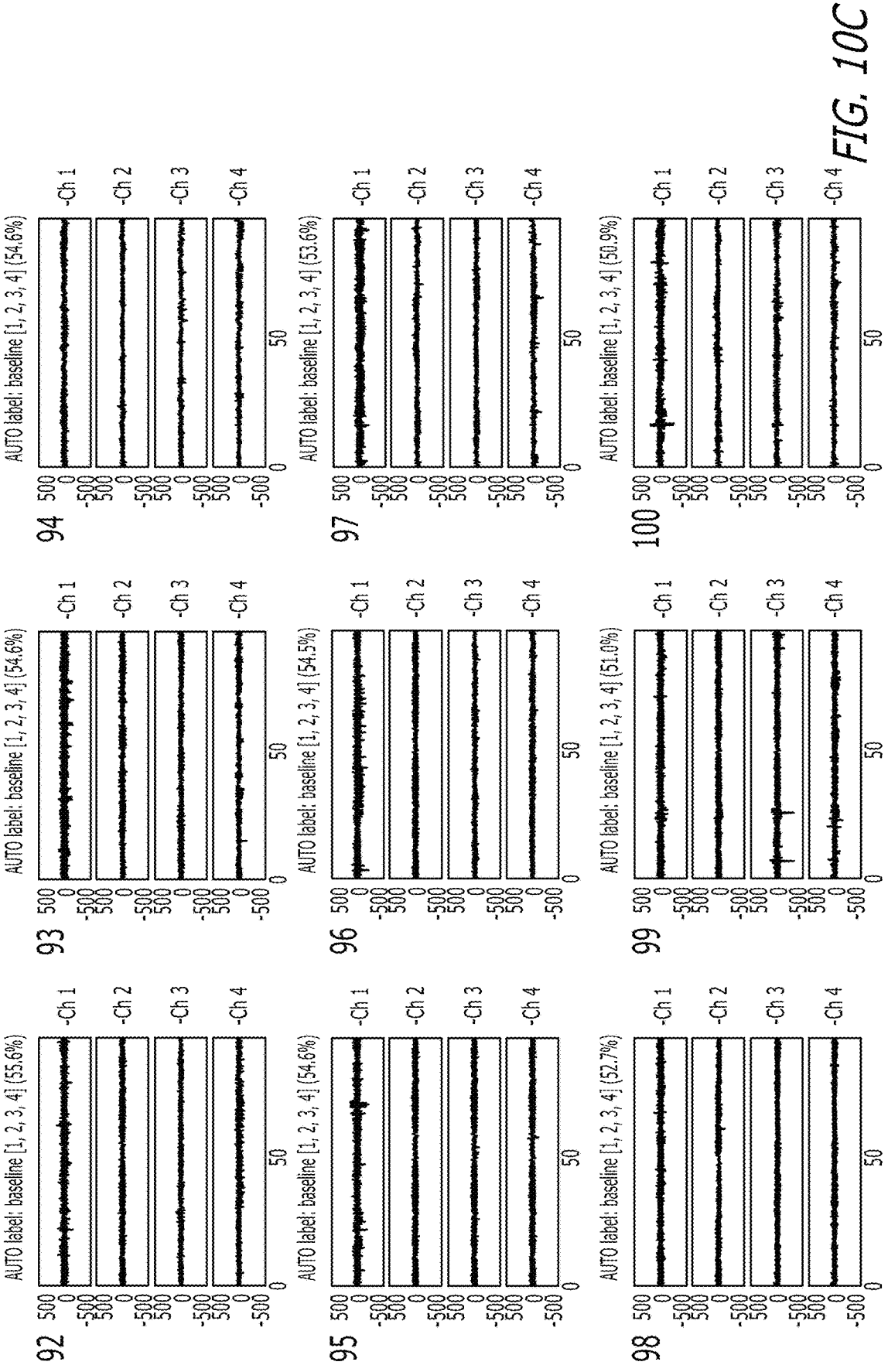

Another example of the feature vector selection, automatic label assignment, and label validation operations of blocks 308 through 316 is illustrated in FIGS. 10A, 10B and 10C. Beginning with FIG. 10A, a feature vector within a cluster 1002 is selected by a user though a graphical user interface. The selected feature vector may be the centroid or center vector 1004 of the cluster 1002 or a feature vector that is close to the center vector of the cluster. In the example shown in FIG. 10A, the center vector 1004 is displayed as a large dot.

Upon selection of the feature vector 1004, the EEG record 1006 corresponding to the selected feature vector is displayed on the display 210 screen. The user views the EEG record 1006 and provides a label for that record, through the user interface 212, in one of the manners described above. In the example shown in FIG. 10A, the records classification processor 104 received an "baseline" label for the displayed EEG record 1006. At this stage, the records classification processor 104 may automatically assign the same label to the remaining EEG records associated with the cluster 1002. Alternatively, the records classification processor 104 may request user review and expert labeling of one or more additional EEG records associated with the cluster 1002 before automatically assigning labels to the rest of the EEG records associated with the cluster. Upon completion of the automatic labeling, the automatic labels are validated.

Label validation includes generating a sorted order in which the EEG records associated with a cluster are to be displayed and validated. Assuming the cluster in FIG. 10A, contains about 100 EEG records, a sorted list of the 100 EEG records would be generated, With reference to FIGS. 10B and 10C, the first nine EEG records of the 100 records are shown in FIG. 10B and identified by numbers 1 through 9, while the last nine EEG records are shown in FIG. 10C and identified by numbers 92 through 100. EEG record #1 corresponds to the EEG records that was manually assigned the expert label. This EEG record also corresponds to the center vector 1004 that is at the center of the cluster 1002. EEG record #1 is followed in order by the rest of the EEG records within the cluster 1002 based on distance from the center vector 1004. Accordingly, the EEG records displayed at the top of the list, such as the ones shown in FIG. 10B, are closest in distance to the center vector 1004 and thus are the ones most similar to EEG record #1. The EEG records further down the order, such as the ones shown in FIG. 10C, are ones that are least similar to the EEG record #1.

Thus, FIG. 10B shows an example first validation display page with the top nine EEG records in the sorted list. The user will be able to quickly verify whether the labels automatically assigned to the top nine EEG records in the sorted list are accurate and move on to the next display EEG records. In the last validation page illustrated in FIG. 10C, user will also be able to quickly verify whether the labels automatically assigned to the bottom nine EEG records in the sorted list are accurate. Accordingly, the user will not have to reclassify/relabel any of the EEG records for this cluster 1002.

Figure 11A:
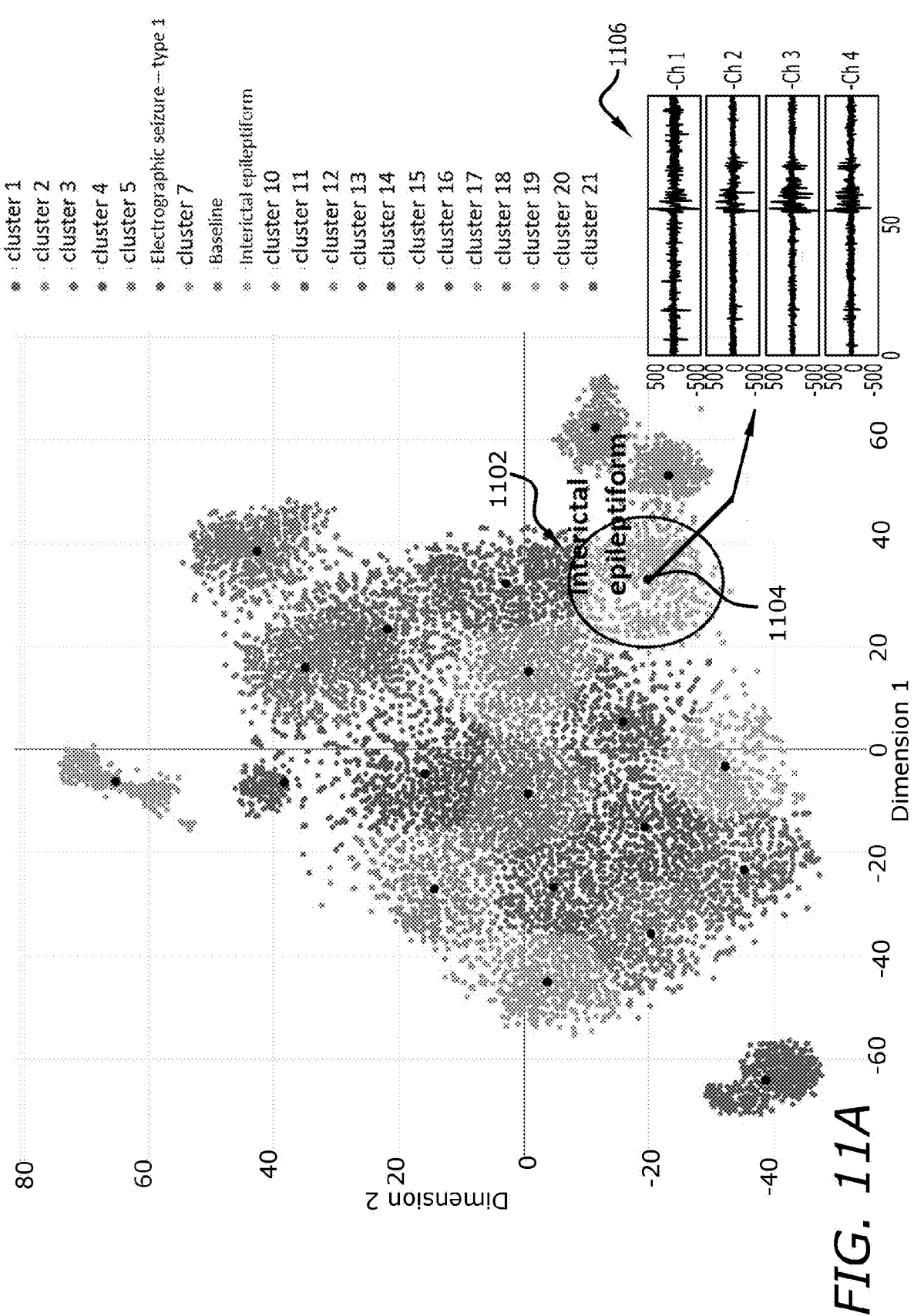
FIG. 11A is a graphical representation of the display of FIG. 8 illustrating a "interictal epileptiform" label for a cluster that results from the operation of the labeling module of FIG. 2.
Figure 11B:
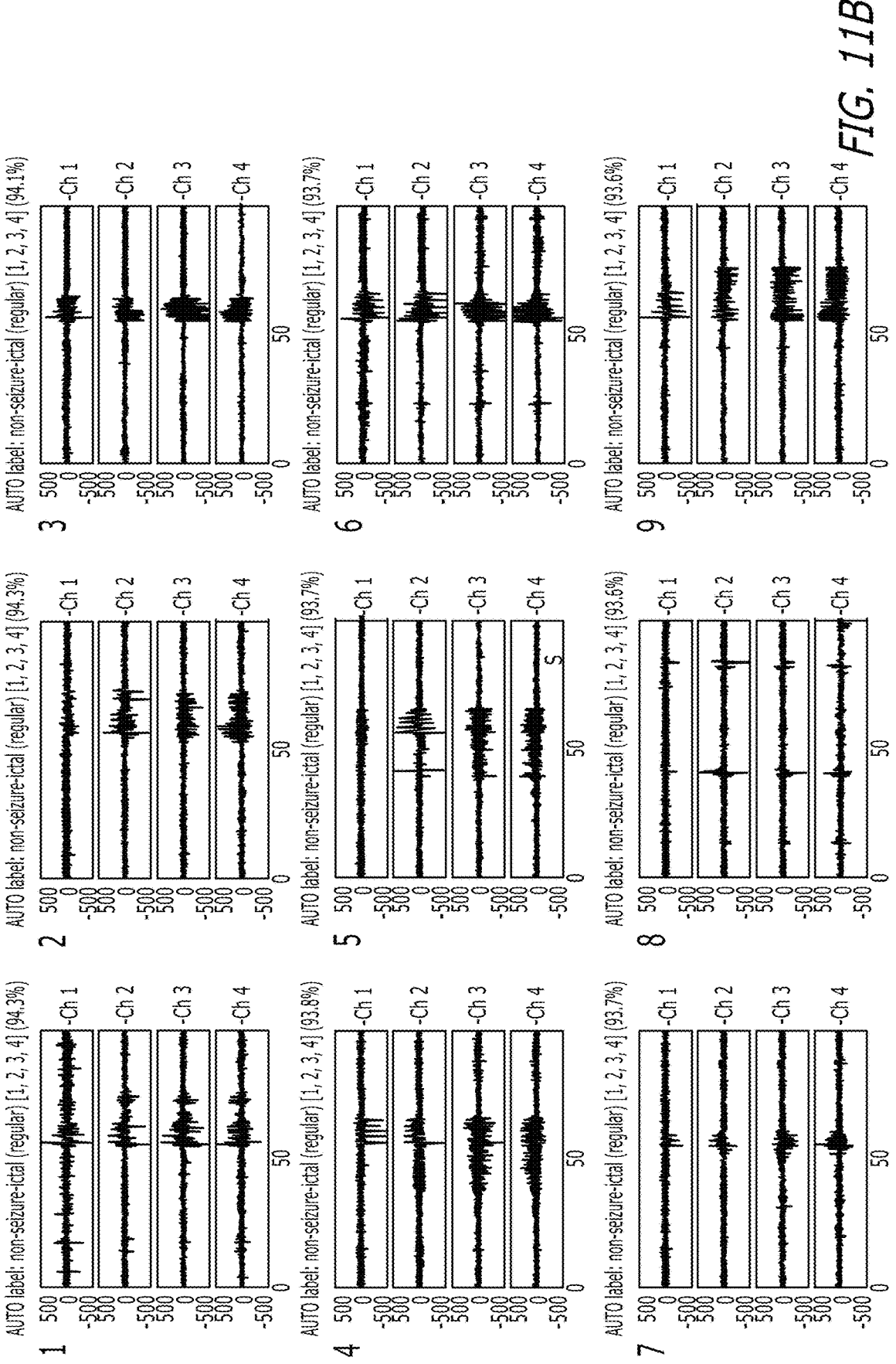
FIGS. 11B and 11C are graphical representations of EEG records associated with the cluster of FIG. 11A in a sorted order that results from the operation of the label validation module of FIG. 2.
Figure 11C:
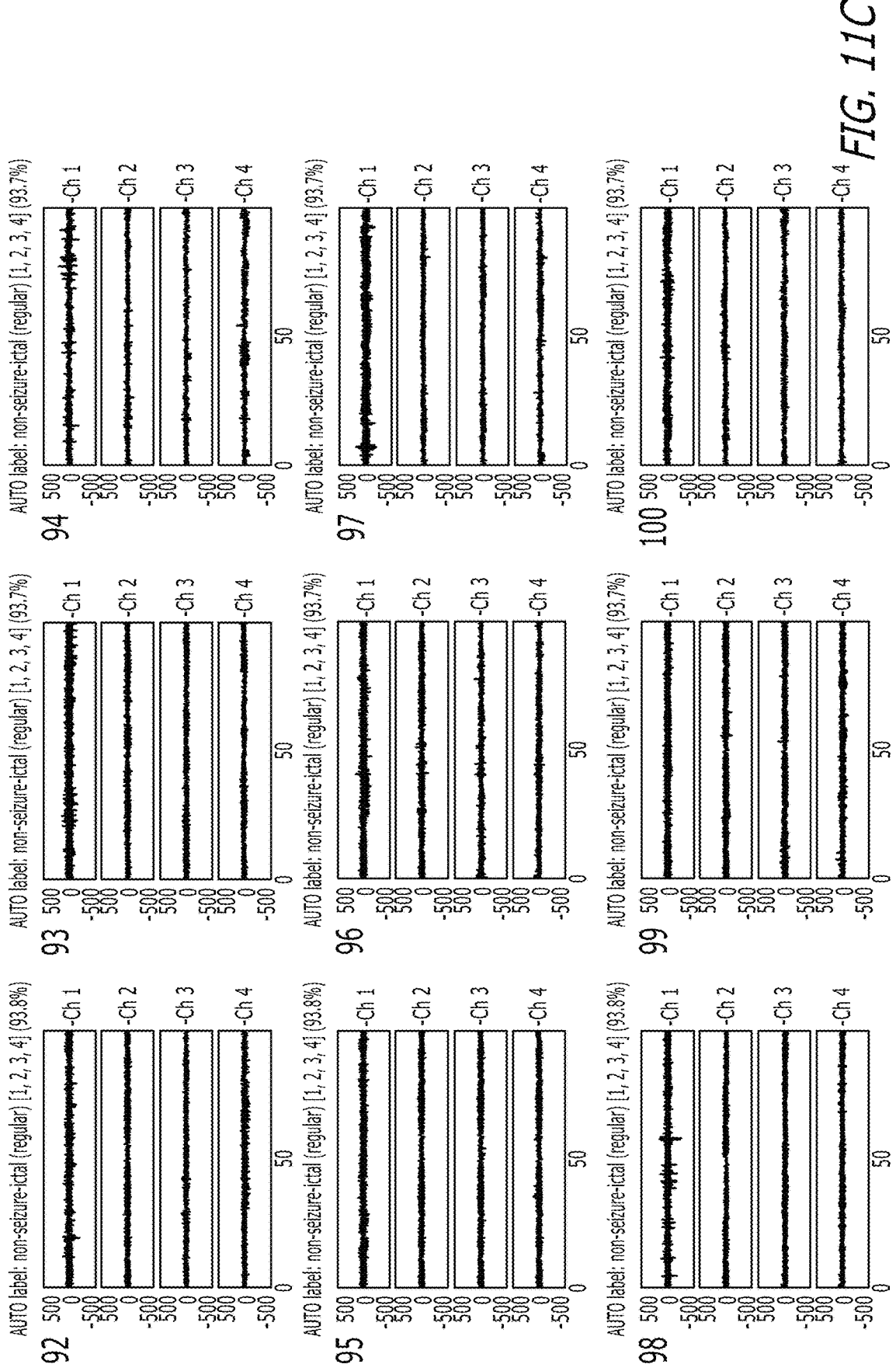

Another example of the feature vector selection, automatic label assignment, and label validation operations of blocks 308 through 316 is illustrated in FIGS. 11A, 11B and 11C. Beginning with FIG. 11A, a feature vector within a cluster 1102 is selected by a user though a graphical user interface. The selected feature vector may be the centroid or center vector 1104 of the cluster 1102 or a feature vector that is close to the center vector of the cluster. In the example shown in FIG. 11A, the center vector 1004 is displayed as a large dot.

Upon selection of the feature vector 1104, the EEG record 1106 corresponding to the selected feature vector is displayed on the display 210 screen. The user views the EEG record 1106 and provides a label for that record, through the user interface 212, in one of the manners described above. In the example shown in FIG. 11A, the records classification processor 104 received an "interictal epileptiform" label for the displayed EEG record 1106. At this stage, the records classification processor 104 may automatically assign the same label to the remaining EEG records associated with the cluster 1102. Alternatively, the records classification processor 104 may request user review and expert labeling of one or more additional EEG records associated with the cluster 1102 before automatically assigning labels to the rest of the EEG records associated with the cluster. Upon completion of the automatic labeling, the automatic labels are validated.

Label validation includes generating a sorted order in which the EEG records associated with a cluster are to be displayed and validated. Assuming the cluster in FIG. 11A, contains about 100 EEG records, a sorted list of the 100 EEG records would be generated, With reference to FIGS. 11B and 11C, the first nine EEG records of the 100 records are shown in FIG. 11B and identified by numbers 1 through 9, while the last nine EEG records are shown in FIG. 11C and identified by numbers 92 through 100. EEG record #1 corresponds to the EEG records that was manually assigned the expert label. This EEG record also corresponds to the center vector 1104 that is at the center of the cluster 1102. EEG record #1 is followed in order by the rest of the EEG records within the cluster 1002 based on distance from the center vector 1004. Accordingly, the EEG records displayed at the top of the list, such as the ones shown in FIG. 11B, are closest in distance to the center vector 1104 and thus are the ones most similar to EEG record #1. The EEG records further down the order, such as the ones shown in FIG. 11C, are ones that are least similar to the EEG record #1.

Thus, FIG. 11B shows an example first validation display page with the top nine EEG records in the sorted list. In viewing these labels, however, the user may determine that one or more of the records are not accurately labeled. For example, while EEG records #2, #3, #6, #7 and #8 are accurate, the user may determine that EEG records #4, #5, and #9 should be labeled "electrographic seizure—type 2." Accordingly, the user will be able to select these EEG records and reclassify/relabel them as such. In the last validation page illustrated in FIG. 11C, it can be seen that EEG records #92 through #100 do not look very much like the rest of the EEG records in this cluster. Accordingly, the user will be able to select these EEG records and reclassify/relabel them as something else. For example, in the case of FIG. 11C, the last nine EEG records may be relabeled as "baseline" EEG records.

Figure 12:
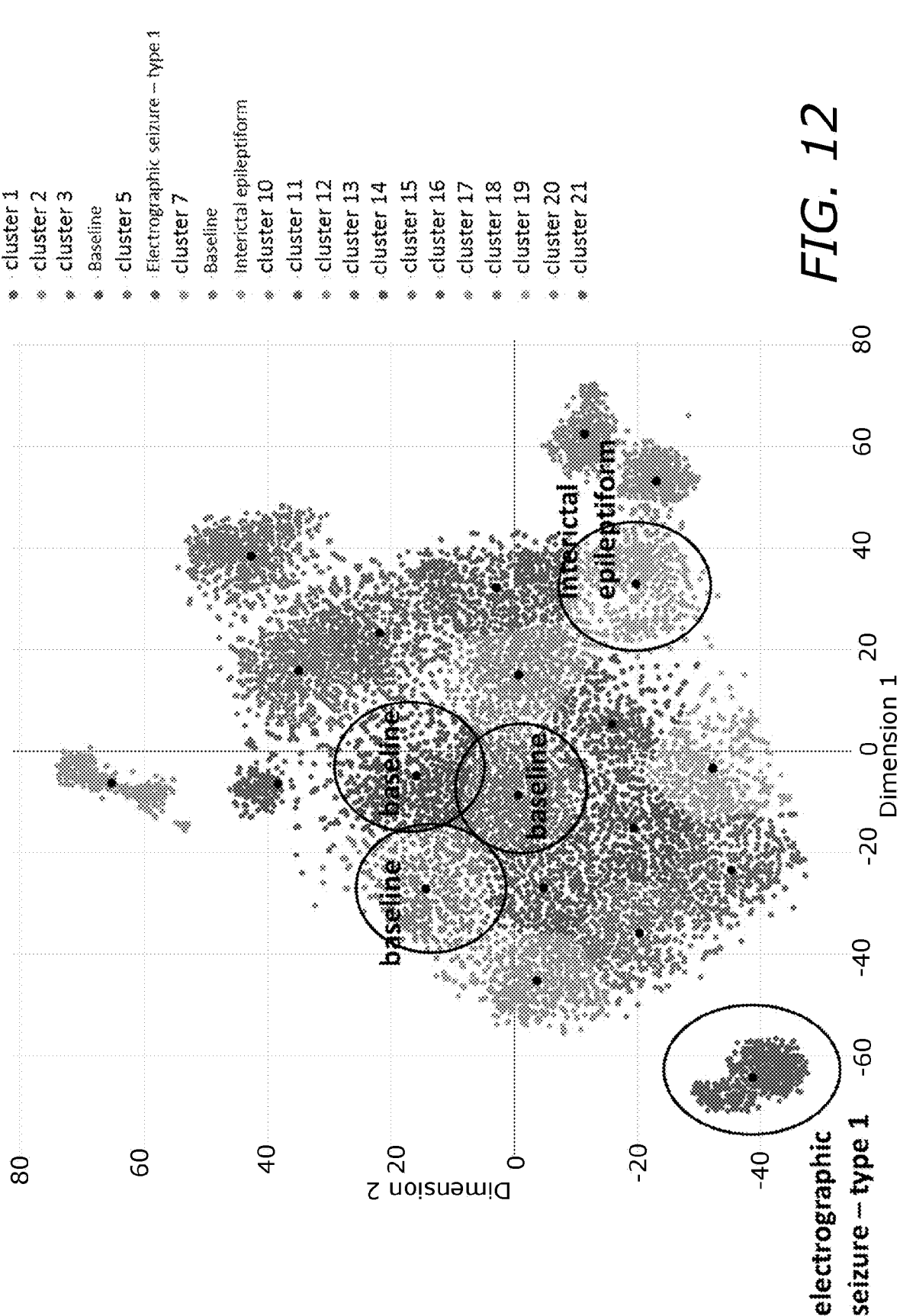
FIG. 12 is a graphical representation of the display of FIG. 8 illustrating a "baseline" label for three adjacent clusters that results from the operation of the labeling module of FIG. 2.

The labeling and validation process illustrated by FIGS. 9A-11C may be repeated for all the clusters to obtain a full set of expert labeled EEG records. In one configuration, the label assignment module 222 may be configured to merge adjacent clusters with the same label into a single a cluster and to compute a new cluster center. For example, in FIG. 12, three neighboring clusters were labeled as baseline. In this case, the label assignment module 222 may merge the three clusters into one larger cluster (not shown) and compute a new cluster center.

While the foregoing labeling process has been described with respect to a single user, the system may allow multiple users to assign labels. For example, two experts may be asked to assign labels. One of them might be a resident in neurology and another might be a neurologist with several years of clinical practice experience. In such case, the records classification processor 104 may be configured to give more weight to the expert with many years of experience over the resident. For example, the resident may get a weight of 2 and the experienced neurologist will get a weight of 3. So, if two residents each label an EEG record as one thing and the experienced neurologist labels the same EEG record as another thing, based on the weights given to the residents and the experienced neurologist, the records classification processor 104 will assign to that EEG records, the label given to it by the residents (since 2 residents*2 points each=4 points>1 experienced neurologist*3 points=3 points).

While the foregoing labeling process has been described with respect to the labeling of EEG records associated with feature vectors in a cluster, additional types of records may be labeled in the process. To this end, more than one record may be associated with a feature vector based on a common parameter, such as the time of day the record was captured or the event that triggered the capture. For example, several modalities of records may be captured at the same time based on a schedule, or upon occurrence of a triggering event, such as the detection of a neurological event, e.g., seizure onset.

These modalities and their corresponding records may include, for example, one or more of: 1) electrical activity of the drain in the form of a time series waveform or spectrogram, 2) neural tissue motion in the form of an accelerometer recording, 3) heart rate in the form of an EKG waveform, 4) blood profusion in the form of a blood flow measurements at an instance in time or over a period of time, 5) blood oxygenation in the form of blood oxygenation values at an instance in time or over a period of time, and 6) neuromodulator concentrations in the form of measures of concentration at an instance in time or over a period of time.

Accordingly, during labeling of the EEG record associated with a selected feature vector, other records of different modalities that were captured concurrent with that EEG record may also be displayed and labeled in accordance with the method of FIG. 3. Thus, multiple types of physiological records may be labeled and validated.

Having thus described the configuration and operation of a system 100 including a records classification processor 104 that provides for a more manageable, less time consuming process for human expert labeling of large datasets, an overview of an example implanted neurostimulation system that may be included in the system is provided.

Overview of Implanted Neurostimulation System

Figure 13:
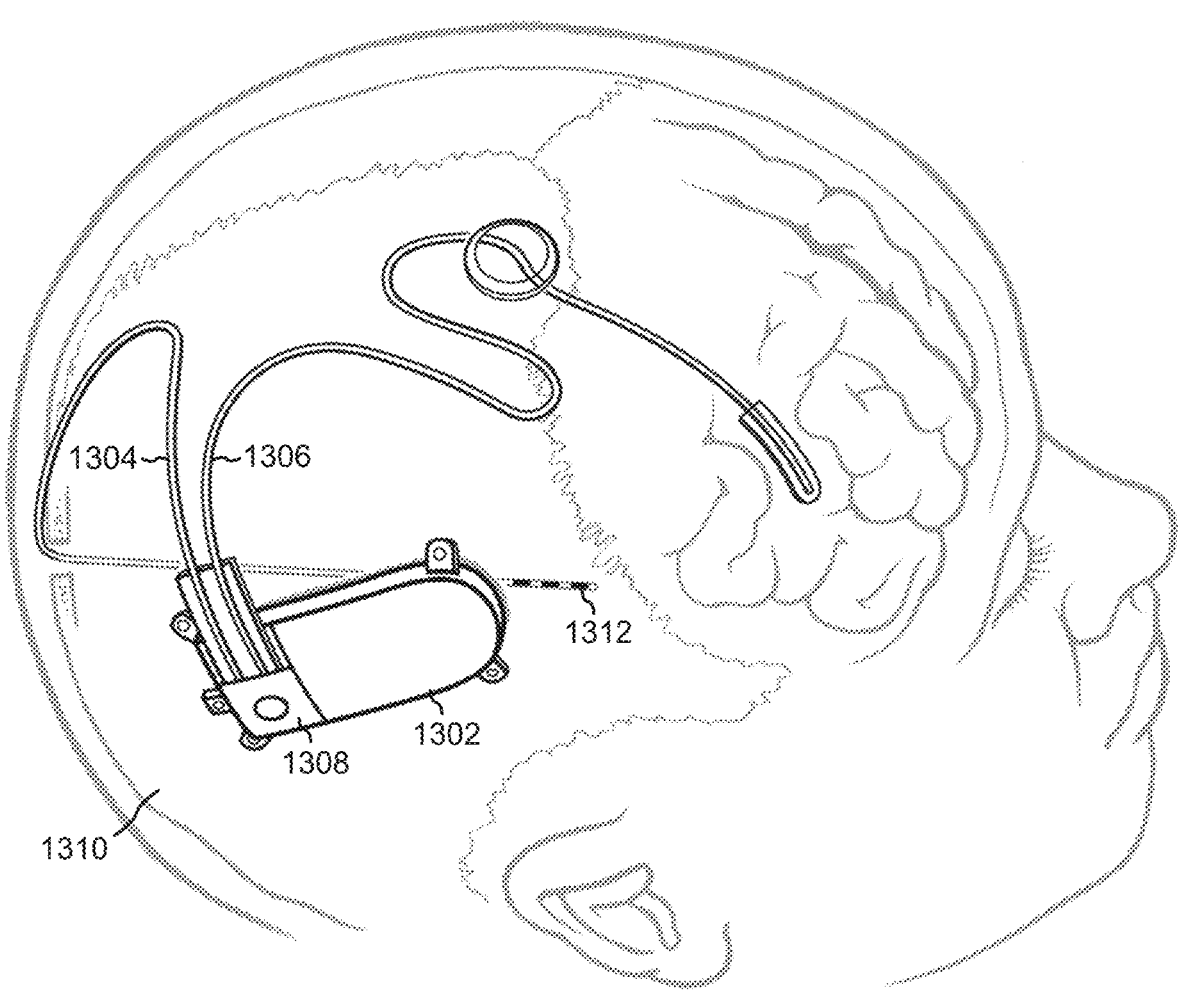
FIG. 13 is a perspective, schematic illustration of an implanted neurostimulation system implanted in a patient and configured to sense and record EEG records and provide such records as part of the system of FIG. 1.

FIG. 13 is an illustration of the implanted neurostimulation system including an active neurostimulator 1302 and two electrode-bearing brain leads 1304, 1306, implanted in a patient. The system is configured to sense and record electrical brain activity and other physiological information and provide such records as part of the system of FIG. 1B.

The neurostimulator 1302 includes a lead connector 1308 adapted to receive one or more of the brain leads, such as a deep brain or depth lead 1304 and a cortical strip lead 1306. The depth lead is implanted so that a distal end of it is situated within the patient's neural tissue, whereas the cortical strip lead is implanted under the dura mater so that a distal end of it rests on a surface of the brain. The lead connector 1308 acts to physically secure the brain leads 1304, 1306 to the neurostimulator 1302, and facilitates electrical connection to conductors in the brain leads 1304, 1306 coupling one or more electrodes at or near a distal end of the lead to circuitry within the neurostimulator 1302.

The proximal portion of the deep brain lead 1304 is generally situated on the outer surface of the cranium 1310 (and under the patient's scalp), while the distal portion of the lead enters the cranium 1310 and is coupled to at least one depth electrode 1312 implanted in a desired location in the patient's brain. The proximal portion of the cortical lead 1306 is generally situated on the outer surface of the cranium 1310 (and under the patient's scalp), while the distal portion of the lead enters the cranium 1310. The distal portion of the cortical lead 1306 includes at least one cortical electrode (not visible) implanted in a desired location on the patient's brain.

Figure 14:
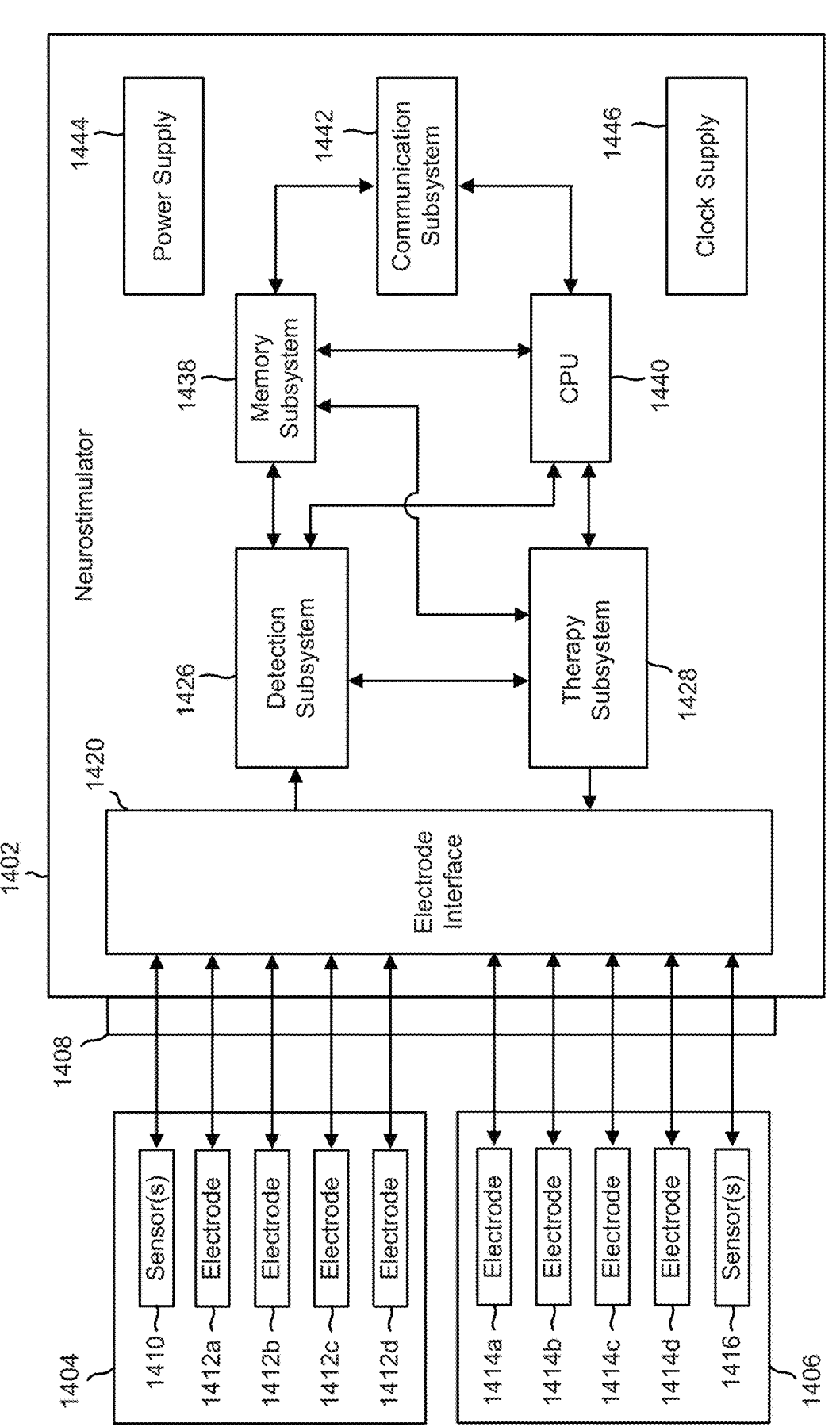
FIG. 14 is a block diagram of the implanted neurostimulation system of FIG. 13, illustrating some of the functional subsystems of the system.

FIG. 14 is a block diagram of the implanted neurostimulation system of FIG. 13. The system may be configured to sense electrical brain activity, detect neurological events in accordance with a set of detection parameters, delivery electrical neurostimulation to the brain in accordance with a set of stimulation parameters, and store records of electrical brain activity and other physiological information for transmission to the database 106 of the system of FIG. 1B.

The neurostimulator 1402 includes a lead connector 1408 adapted to receive a connector end of each brain lead 1404, 1406, to thereby electrically couple each lead and its associated electrodes 1412a-d, 1414a-d with the neurostimulator. The neurostimulator 1402 may configure an electrode 1412a-d, 1414a-d as either a sensor (for purposes of sensing electrical activity of the brain) or a stimulator (for purposes of delivering therapy to the patient in the form of electrical stimulation) or both.

The electrodes 1412a-d, 1414a-d are connected to an electrode interface 1420. The electrode interface 1420 can select each electrode 1412a-d, 1414a-d as required for sensing and stimulation. The electrode interface 1420 may also provide any other features, capabilities, or aspects, including but not limited to amplification, isolation, and charge-balancing functions, that are required for a proper interface with neurological tissue. The electrode interface 1420 is coupled to a detection subsystem 1426, which is configured to process electrical activity of the brain sensed through the electrode 1412a-d, 1414a-d. The electrode interface 1420 may also be coupled to a therapy subsystem 1428, which is configured to deliver therapy to the patient through the electrode 1412a-d, 1414a-d in the form of electrical stimulation.

One or both of the brain leads 1404, 1406 may have one or more physiological sensors 1410, 1416 that enable the capture and recording of other types of physiological information, e.g., pH levels, blood oxygen levels, neurotransmitters concentrations, heart rate, blood pressure, blood glucose levels, hormone levels, sleep states, posture, etc. To this end, one or both of the brain leads 1404, 1406 may be configured as disclosed in U.S. Pat. No. 10,123,717, entitled Multimodal Brain Sensing Lead, which is herein incorporated by reference, and the one or more physiological sensors 1410, 1416 may correspond to different transducers, e.g., macroelectrodes, microelectrodes, light emitters, and photodetectors that enable different sensing modalities.

The neurostimulator 1402 includes a memory subsystem 1438 and a central processing unit (CPU) 1440, which can take the form of a microcontroller. The memory subsystem 1438 is coupled to the detection subsystem 1426, and may receive and store records of data representative of sensed electrographic signals for transmission to the system of FIG. 1B. The memory subsystem 1438 is also coupled to the therapy subsystem 1428 and the CPU 1440. In addition to the memory subsystem 1438, the CPU 1440 is also connected to the detection subsystem 1426 and the therapy subsystem 1428 for direct control of those subsystems.

The neurostimulator 1402 also includes a communication subsystem 1442. The communication subsystem 1442 enables communication between the neurostimulator 1402 and an external device, such as a programmer 116 or patient monitor 110, through a wireless communication link. As described above with reference to FIG. 1B, the programmer 116 allows a clinician to read out records of patient data, as well as ancillary information associated with those records. The neurostimulator 1402 also includes a power supply 1444 and a clock supply 1446. The power supply 1444 supplies the voltages and currents necessary for each of the other subsystems. The clock supply 1446 supplies substantially all the other subsystems with any clock and timing signals necessary for their operation.

Overview of Records Classification Processor

Figure 15:
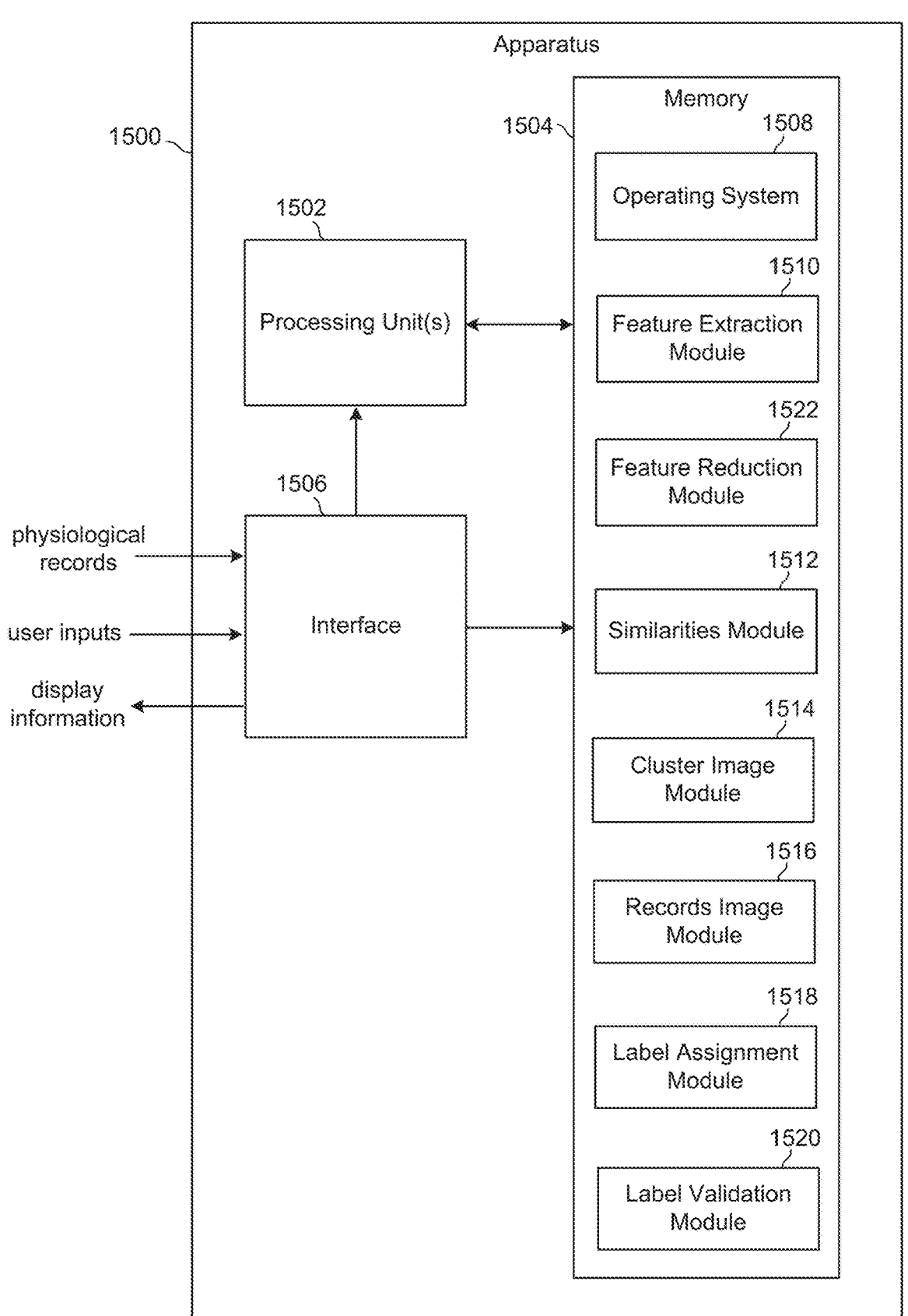
FIG. 15 is a schematic block diagram of an apparatus corresponding to the records classification processor of FIG. 2.

FIG. 15 is a schematic block diagram of an apparatus 1500 corresponding to the records classification processor of FIG. 2. The apparatus 1500 is configured to execute instructions related to the records classification with expert labeling and validation processes described above with reference to FIG. 3, including the application of unsupervised machine-learned models to physiological records. The apparatus 1500 may be embodied in any number of processor-driven devices, including, but not limited to, a server computer, a personal computer, one or more networked computing devices, an application-specific circuit, a minicomputer, a microcontroller, and/or any other processor-based device and/or combination of devices.

The apparatus 1500 may include one or more processing units 1502 configured to access and execute computer-executable instructions stored in at least one memory 1504. The processing unit 1502 may be implemented as appropriate in hardware, software, firmware, or combinations thereof. Software or firmware implementations of the processing unit 1502 may include computer-executable or machine-executable instructions written in any suitable programming language to perform the various functions described herein. The processing unit 1502 may include, without limitation, a central processing unit (CPU), a digital signal processor (DSP), a reduced instruction set computer (RISC) processor, a complex instruction set computer (CISC) processor, a microprocessor, a microcontroller, a field programmable gate array (FPGA), a System-on-a-Chip (SOC), or any combination thereof. The apparatus 1500 may also include a chipset (not shown) for controlling communications between the processing unit 1502 and one or more of the other components of the apparatus 1500. The processing unit 1502 may also include one or more application-specific integrated circuits (ASICs) or application-specific standard products (ASSPs) for handling specific data processing functions or tasks.

The memory 1504 may include, but is not limited to, random access memory (RAM), flash RAM, magnetic media storage, optical media storage, and so forth. The memory 1504 may include volatile memory configured to store information when supplied with power and/or non-volatile memory configured to store information even when not supplied with power. The memory 1504 may store various program modules, application programs, and so forth that may include computer-executable instructions that upon execution by the processing unit 1502 may cause various operations to be performed. The memory 1504 may further store a variety of data manipulated and/or generated during execution of computer-executable instructions by the processing unit 1502.

The apparatus 1500 may further include one or more interfaces 1506 that may facilitate communication between the apparatus and one or more other apparatuses. For example, the interface 1506 may be configured to receive physiological records from a database and user inputs from a user interface, and to output information to a display. Communication may be implemented using any suitable structure or communications standard. For example, communication with a database may be through a LAN interface that implement protocols and/or algorithms that comply with various communication standards of the Institute of Electrical and Electronics Engineers (IEEE), such as IEEE 802.11. Communication with a user interface and display may be through wired structures.

The memory 1504 may store various program modules, application programs, and so forth that may include computer-executable instructions that upon execution by the processing unit 1502 may cause various operations to be performed. For example, the memory 1504 may include an operating system module (O/S) 1508 that may be configured to manage hardware resources such as the interface 1506 and provide various services to applications executing on the apparatus 1500.

The memory 1504 stores additional program modules such as: (1) a feature extraction module 1510 that receives and processes physiological records to obtain feature vectors; (2) a feature reduction module 1522 that reduces the dimensionality of feature vectors output by the feature extraction module 1510; (3) a similarities module 1512 that receives and processes the reduced-dimension feature vectors and forms clusters; (4) a cluster image module 1514 that outputs information that enables a display to present a graphical representation of the clusters; (5) a record image module 1516 that outputs information that enables a display to present a graphical representation of EEG records; (6) a label assignment 1518 module that enables the apparatus to receive input from a user interface related to the labeling of EEG records, and (7) a label validation module 1520 that outputs information that enables a display to present a graphical representation of the EEG records in a sorted order and that enables the apparatus to receive input from a user interface related to the confirming of the labeling of EEG records and the relabeling of EEG records. Each of these modules includes computer-executable instructions that when executed by the processing unit 1502 cause various operations to be performed, such as the operations described immediately above and earlier with reference to FIG. 3.

The apparatus 1500 and modules disclosed herein may be implemented in hardware or software that is executed on a hardware platform. The hardware or hardware platform may be a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A records classification processor for labeling records of electrical activity of a brain, the records classification processor comprising:
    a records section module configured to select a plurality of from records stored in a database such that the records in the plurality of records of electrical activity of the brain have at least one parameter in common, where the at least one parameter in common comprises one of: time of capture of the electrical activity of the brain, date of capture of the electrical activity of the brain, area of a brain where electrical activity of the brain was sensed, and a characteristic of the electrical activity of a brain;
    a feature extraction module configured to derive a plurality of multi-dimensional feature vectors from the plurality of records of electrical activity of the brain;
    a feature reduction module configured to reduce the plurality of multi-dimensional feature vectors to a corresponding plurality of reduced-dimension feature vectors;
    a similarities module configured to form a plurality of clusters based on the plurality of reduced-dimension feature vectors, wherein each cluster has associated therewith a set of records of electrical activity of the brain; and
    a labeling module configured to enable, for at least one of the plurality of clusters:
        an automatic assignment of an automatically assigned label to each record of electrical activity of the brain included in the set of records of electrical activity of the brain associated with the cluster, and
        a validation of one or more of the automatically assigned labels,
    wherein the labeling module validates one or more automatically-assigned labels by being configured to:
    provide an output comprising information that enables a display of a record of electrical activity of the brain together with its automatically assigned label; and
    enable a mechanism for confirming an accuracy of the automatically assigned label.

2. The records classification processor of claim 1, wherein the feature extraction module is configured to apply a deep learning model to each of the plurality of records of electrical activity of the brain to derive the plurality of multidimensional feature vectors.

3. The records classification processor of claim 2, wherein the deep learning model comprise one or more of a pretrained convolution neural network (CNN), an autoencoder, a recurrent neural network (RNN), or a deep neural network.

4. The records classification processor of claim 1, wherein the feature reduction module is configured to apply a dimensionality reduction process to each of the plurality of multidimensional feature vectors to derive the corresponding plurality of reduced-dimension feature vectors.

5. The records classification processor of claim 4, wherein the dimensionality reduction process is implemented through at least one of principal component analysis, t-distributed stochastic gradient descent, and t-distributed stochastic gradient neighbor embedding.

6. The records classification processor of claim 1, wherein the similarities module is configured to apply a clustering algorithm to the plurality of reduced-dimension feature vectors to form the plurality of clusters.

7. The records classification processor of claim 6, wherein the clustering algorithm comprises one of k-means clustering, spectral clustering, or a Bayesian Gaussian mixed model.

8. The records classification processor of claim 1, further comprising an interface configured to be coupled to a user interface to receive user inputs, and to be coupled to a display to output display information, wherein the labeling module is configured to enable an automatic assignment of a label to each record of electrical activity of the brain included in the set of records by being configured to:

provide an output to the interface comprising information that enables a display of the plurality of clusters;

enable a mechanism through the display and user interface for selecting at least one record of electrical activity of the brain associated with one of the displayed plurality of clusters;

provide an output to the interface comprising information that enables a display of the at least one selected record of electrical activity of the brain;

enable a mechanism through the display and user interface for assigning a label to the at least one displayed record of electrical activity of the brain; and automatically assign the assigned label to the other records of electrical activity of the brain associated with the cluster that the at least one selected record of electrical activity of the brain is associated with, to create automatically-labeled records of electrical activity of the brain.

9. The records classification processor of claim 8, wherein the labeling module is further configured to:

confirm that a same label has been assigned to each of the at least one displayed record of electrical activity of the brain prior to automatically assigning the label to the other records of electrical activity of the brain associated with the cluster.

10. The records classification processor of claim 1, wherein the labeling module is further configured to enable a mechanism for assigning a different label to a record of electrical activity of the brain when the accuracy of the automatically assigned label is not confirmed for the record.

11. The records classification processor of claim 1, wherein the labeling module is further configured to automatically associate a record of electrical activity of the brain to an adjacent cluster in the plurality of clusters when the accuracy of the automatically assigned label for the record is not confirmed.

12. The records classification processor of claim 11, wherein the labeling module is configured to select the adjacent cluster based on a measure of similarity between the reduced-dimension feature vector corresponding to the record of electrical activity of the brain and centroid feature vectors of clusters surrounding the selected cluster.

13. The records classification processor of claim 1, wherein the labeling module is configured to validate the automatically assigned labels of records of electrical activity of the brain in an order that is determined based on a distance between each reduced-dimension feature vector corresponding to a record of electrical activity of the brain in a selected cluster and a centroid feature vector of the selected cluster.

14. A method of labeling records of electrical activity of the brain, the method comprising:

selecting a plurality of records of electrical activity of the brain from records stored in a database such that the records in the plurality of records of electrical activity of the brain have at least one parameter in common, where the at least one parameter in common comprises one of: time of capture of the electrical activity of the brain, date of capture of the electrical activity of the brain, area of a brain where electrical activity of the brain was sensed, and a characteristic of the electrical activity of a brain;

deriving a plurality of multi-dimensional feature vectors from the plurality of records of electrical activity of the brain;

reducing the plurality of multi-dimensional feature vectors to a corresponding plurality of reduced-dimension feature vectors;

forming a plurality of clusters based on the plurality of reduced-dimension feature vectors, wherein each cluster has associated therewith a set of records of electrical activity of the brain; and enabling, for at least one of the plurality of clusters, an automatic assignment of an automatically assigned label to each record of electrical activity of the brain included in the set of records of electrical activity of the brain associated with the cluster, and a validation of one or more of the automatically assigned labels, wherein validating one or more automatically-assigned labels comprises:

providing an output comprising information that enables a display of a record of electrical activity of the brain together with its automatically assigned label; and enabling a mechanism for confirming an accuracy of the automatically assigned label.

15. The method of claim 14, further comprising:

providing an output to an interface coupled to a user interface to receive user inputs, and to a display to output display information, the output comprising information that enables a display of the plurality of clusters;

enabling a mechanism through the display and a user interface for selecting at least one record of electrical activity of the brain associated with one of the displayed plurality of clusters;

providing an output to the interface comprising information that enables a display of the at least one selected record of electrical activity of the brain;

enabling a mechanism through the display and the user interface for assigning a label to the at least one displayed record of electrical activity of the brain; and automatically assigning the assigned label to the other records of electrical activity of the brain associated with the cluster that the at least one selected record of electrical activity of the brain is associated with, to create automatically-labeled records of electrical activity of the brain.

16. The method of claim 15, further comprising:

confirming that a same label has been assigned to each of the at least one displayed record of electrical activity of the brain prior to automatically assigning the label to the other records of electrical activity of the brain associated with the cluster.

17. The method of claim 14, further comprising enabling a mechanism for assigning a different label to a record of electrical activity of the brain when the accuracy of the automatically assigned label is not confirmed for the record.

18. The method of claim 14, further comprising automatically associating a record of electrical activity of the brain to an adjacent cluster in the plurality of clusters when the accuracy of the automatically assigned label for the record is not confirmed.

19. The method of claim 18, further comprising selecting the adjacent cluster based on a measure of similarity between the reduced-dimension feature vector corresponding to the record of electrical activity of the brain and centroid feature vectors of clusters surrounding the selected cluster.

20. The method of claim 14, further comprising validating the automatically assigned labels of records of electrical activity of the brain in an order that is determined based on a distance between each reduced-dimension feature vector corresponding to a record of electrical activity of the brain in a selected cluster and a centroid feature vector of the selected cluster.

\* \* \* \* \*